US008859688B2

(12) United States Patent
Tiller et al.

(10) Patent No.: US 8,859,688 B2
(45) Date of Patent: Oct. 14, 2014

(54) POLYMER-BONDED QUATERRYLENE AND/OR TERRYLENE DYES AND COMPOSITIONS CONTAINING SAME

(75) Inventors: Thomas Tiller, Bussigny (CH); Cécile Pasquier, Marly (CH); Aurélien Georges Jean Commeureuc, Echichens (CH)

(73) Assignee: SICPA Holding SA, Prilly (CH)

( * ) Notice: Subject to any disclaimer, the term of this patent is extended or adjusted under 35 U.S.C. 154(b) by 223 days.

(21) Appl. No.: 13/479,872

(22) Filed: May 24, 2012

(65) Prior Publication Data

US 2012/0299286 A1    Nov. 29, 2012

Related U.S. Application Data

(60) Provisional application No. 61/489,891, filed on May 25, 2011.

(30) Foreign Application Priority Data

May 25, 2011   (EP) .................................... 11167522

(51) Int. Cl.
  C08G 65/48    (2006.01)
  C09B 69/10    (2006.01)
  C09D 11/037   (2014.01)
  C09D 11/328   (2014.01)
  C08L 71/12    (2006.01)
  B42D 15/00    (2006.01)

(52) U.S. Cl.
  CPC ............ *C09D 11/037* (2013.01); *C09B 69/102* (2013.01); *B42D 15/0013* (2013.01); *C09D 11/328* (2013.01); *B42D 2033/20* (2013.01)
  USPC ............................ 525/390; 524/801; 526/214

(58) Field of Classification Search
  USPC ............................. 524/801; 525/390; 526/214
  See application file for complete search history.

(56) References Cited

U.S. PATENT DOCUMENTS

| | | | |
|---|---|---|---|
| 3,367,937 A | 2/1968 | Fuchs et al. | |
| 3,502,678 A | 3/1970 | Otto et al. | |
| 4,911,731 A | 3/1990 | Loveless et al. | |
| 5,030,697 A | 7/1991 | Hugl et al. | |
| 5,151,516 A | 9/1992 | Beck et al. | |
| 6,277,536 B1 | 8/2001 | Piastra et al. | |
| 6,727,318 B1 * | 4/2004 | Mathauer et al. | 524/801 |
| 7,544,448 B2 * | 6/2009 | Cole et al. | 430/9 |
| 7,582,150 B2 | 9/2009 | Jaunky et al. | |
| 7,582,151 B2 | 9/2009 | Jaunky et al. | |
| 7,582,152 B2 | 9/2009 | Jaunky et al. | |
| 7,795,431 B2 * | 9/2010 | Pschirer et al. | 546/27 |
| 7,812,113 B2 | 10/2010 | Deroover et al. | |
| 7,846,992 B2 | 12/2010 | Deroover et al. | |
| 2002/0112297 A1 | 8/2002 | Kaul et al. | |
| 2002/0182422 A1 | 12/2002 | Garrett et al. | |
| 2004/0194665 A1 | 10/2004 | Konemann et al. | |
| 2006/0058330 A1 | 3/2006 | Krieger et al. | |
| 2008/0245411 A1 | 10/2008 | Hammermann et al. | |
| 2008/0282481 A1 | 11/2008 | De Boni et al. | |
| 2009/0056793 A1 | 3/2009 | Langhals et al. | |
| 2009/0255063 A1 | 10/2009 | Marquais-Bienewald et al. | |
| 2010/0011656 A1 | 1/2010 | Gessner et al. | |
| 2011/0293899 A1 | 12/2011 | Tiller et al. | |

FOREIGN PATENT DOCUMENTS

| | | |
|---|---|---|
| DE | 198 05 121 A1 | 8/1999 |
| DE | 10 2008 036 495 | 2/2010 |
| EP | 0 361 229 | 4/1990 |
| EP | 0 422 535 A1 | 4/1991 |
| EP | 0 999 239 A2 | 5/2000 |
| EP | 1 172 418 A2 | 1/2002 |
| FR | 1 444 489 A | 7/1966 |
| FR | 1 489 487 A | 7/1967 |
| FR | 2 194 828 A1 | 3/1974 |
| FR | 2 850 651 | 8/2004 |
| GB | 1436903 | 5/1976 |
| WO | 99/24527 | 5/1999 |
| WO | 2006/097360 | 9/2006 |
| WO | 2007/006634 | 1/2007 |
| WO | 2007/006682 | 1/2007 |
| WO | 2008/001036 | 1/2008 |
| WO | 2008/009579 | 1/2008 |
| WO | 2012/160182 | 11/2011 |
| WO | 2011/147857 | 12/2011 |

OTHER PUBLICATIONS

International Search Report issued with respect to PCT/EP2012/059795, mailed Jun. 29, 2012.
Written Opinion issued with respect to PCT/EP201/059795, mailed Jun. 29, 2012.
U.S. Appl. No. 61/489,891 to Tiller et al., filed May 25, 2011.
Marechal, "Polymeric Dyes—Synthesis, Properties and Uses", Progress in Organic Coatings, vol. 10, 1982, pp. 251-287.
Guthrie, "Polymeric colorants", Review of Progress in Coloration, Society of Dyers and Colourists, Bradford, GB. vol. 20, Jan. 1, 1990, pp. 40-52.
Shirosaki et al., "Dyes for hydrophobic fibers XP002678127", Database CA [Online] Chemical Abstracts Service, Columbus Ohio, US, 1976, PP.
Miura et al., "Liquid crystal compositions XP002678128", Database CA [Online] Chemical Abstracts Service, Columbus Ohio, US, 1986, PP.
Imahori et al., "Benzothioxanethene dyes for polyester fibers XP002678129", Database CA [Online] Chemical Abstracts Service, Columbus Ohio, US, 1976, PP.

(Continued)

*Primary Examiner* — Terressa Boykin
(74) *Attorney, Agent, or Firm* — Greenblum & Bernstein, P.L.C.

(57) ABSTRACT

Method for increasing at least one of the solubility and dispersibility of a quaterrylene and/or terrylene dye in a liquid medium, including binding the quaterrylene or terrylene dye to a polymer which is soluble in the liquid medium. Various aspects relate without limitation to polymer-bonded quaterrylene or terrylene dyes, processes, markings, security features, articles and dye-doped polymers.

35 Claims, No Drawings

(56) References Cited

OTHER PUBLICATIONS

Imahori et al., "Coloring organic polymer materials XP002678130", Database CA [Online] Chemical Abstracts Service, Columbus Ohio, US, 1976, PP.

Toba et al., "Holographic recording material with chemical and environmental stability and manufacture of volume phase-type hologram by using same XP002678131", Database CA [Online] Chemical Abstracts Service, Columbus Ohio, US, 1995, PP.

Yamaoka et al., "Polymerizable resin compositions XP002678132", Database CA [Online] Chemical Abstracts Service, Columbus Ohio, US, 1986, PP.

Enokida et al., "Organic electroluminescent devices XP002678126", Database CA [Online] Chemical Abstracts Service, Columbus Ohio, US, 1995, PP.

U.S. Appl. No. 13/683,622 to Cecile Pasquier et al, which was filed Nov. 21, 2012.

U.S. Appl. No. 13/673,418 to Cecile Pasquier et al., which was filed Nov. 9, 2012.

Search Report and Written Opinion for PCT/EP2011/069885, mailed Jun. 27, 2012.

Search Report and Written Opinion for PCT/EP2011/070869, mailed Jul. 2, 2012.

Search Report and Written Opinion for PCT/EP2011/058519, mailed Feb. 8, 2011.

* cited by examiner

POLYMER-BONDED QUATERRYLENE AND/OR TERRYLENE DYES AND COMPOSITIONS CONTAINING SAME

CROSS-REFERENCE TO RELATED APPLICATIONS

The present application claims the benefit under 35 U.S.C. §119(e) of U.S. Provisional Application No. 61/489,891, filed May 25, 2011 and claims priority under 35 U.S.C. §119 of EP 11167522.9, filed May 25, 2011. The entire disclosures of these applications are expressly incorporated by reference herein.

BACKGROUND OF THE INVENTION

1. Field of the Invention

The present invention relates to polymer-bonded quaterrylene and/or terrylene dyes and compositions such as, e.g., printing inks which comprise polymer-bonded quaterrylene and/or terrylene dyes as colorants.

2. Discussion of Background Information

Counterfeiting and market diversion of mass produced goods are facilitated if the products are handled on a lot base rather than on an individual item base. In such case counterfeit or diverted products are easily introduced into the supply chain. Producers and retailers would like to be in a position to distinguish their original products from such counterfeit or diverted (parallel imported or smuggled) products at the level of the individual unit that is sold.

Further, secure documents such as currency, passports, or identity cards are increasingly counterfeit around the world. This situation is a very critical issue for governments and society in general. For example criminal organizations may use fake passports or identity cards for human beings traffic. As reprographic technologies become more and more sophisticated, it becomes even more difficult to make a clear distinction between a fake document and the original. Document security has therefore a considerable impact on the economy of the countries and also on the victims of illicit traffic involving counterfeit documents.

In an attempt to prevent counterfeiting marking is currently used extensively for the recognition, identification and authentication of individual items. The marking may be applied, for example, in the form of indicia such as 1-dimensional barcodes, stacked 1-dimensional barcodes, 2-dimensional barcodes, 3-dimensional barcodes, a data matrix. and the like. The application of markings is frequently carried out by a printing process which uses a printing ink with specific optical properties that are imparted to the ink by one or more substances contained therein such as, e.g., luminescent dyes and pigments and cholesteric liquid crystal compounds.

A class of compounds which is suitable for use in, e.g., printing inks for marking purposes are quaterrylene and terrylene dyes. The parent compounds quaterrylene and terrylene display fluorescence and there are many derivatives of quaterrylene and terrylene which are known and may theoretically be employed as colorants in compositions for marking such as printing inks and the like. However, a drawback of quaterrylene and terrylene dyes is their often unsatisfactorily low solubility or dispersibility in liquid media such as those which are useful in printing inks. This low solubility/dispersibility limits the suitability of quaterrylene and terrylene dyes as colorants for liquid compositions in general. It would thus, be advantageous to be able to increase the solubility and/or dispersibility of quaterrylene and terrylene dyes in liquid media and in particular, liquid media for use in printing inks.

SUMMARY OF THE INVENTION

The present invention provides a method of increasing the solubility and/or dispersibility of a quaterrylene and/or terrylene dye in a liquid medium such as, e.g., a liquid medium comprised in a printing ink composition. The method comprises binding the quaterrylene and/or terrylene dye to a polymer which is soluble in the liquid medium.

In one aspect of the method, the liquid medium may be a polar liquid medium.

In another aspect, the quaterrylene and/or terrylene dye may be covalently bonded to the polymer. For example, the polymer may comprise at least one (recurring) monomer unit that comprises at least one polar group which may, for example, be selected from hydroxy, carboxy and amino groups. Accordingly, the polymer may, for example, comprise a phenolic resin such as, e.g., a phenolic resin of formula

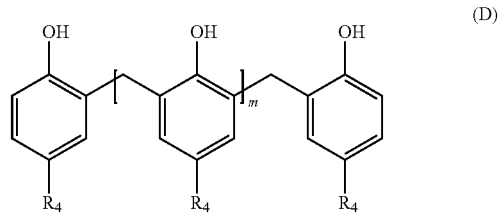

(D)

wherein the groups $R_4$ may be the same or different and are selected from alkyl groups having from 1 to about 10 carbon atoms and the average number of m is from about 1 to about 30, for example, from about 1 to about 25, from about 1 to about 15, from about 1 to about 10, from about 1 to about 5, from about 1 to about 3, from about 5 to about 15, from about 5 to about 10, from about 10 to about 20, or from about 20 to about 30. The groups $R_4$ may be the same or different (preferably the same) and may, for example, be selected from tert-butyl, tert-octyl and branched nonyl. Further, a group $R_4$ may be in the meta- or para-position with respect to the OH group (in formula (D) only the para position is shown), and there may be more than one group $R_4$ (e.g., 2 or 3 groups $R_4$) present on a phenyl ring. For example, if two groups $R_4$ are present on a phenyl ring (the same or different, preferably the same groups $R_4$) they may be present in any of the available positions on the phenyl ring, such as, e.g., meta/para or meta/meta.

In another aspect of the method of the present invention, the quaterrylene and/or terrylene dye may be bonded to the polymer by reacting a group comprised in the quaterrylene and/or terrylene dye with the at least one (preferably) polar group of the polymer. The at least one polar group may, for example, be a hydroxy group and/or the group comprised in the quaterrylene and/or terrylene dye may be a halogen such as, e.g., Br or Cl.

In a still further aspect of the method of the present invention, the quaterrylene and/or terrylene dye may be a compound of formula (A), formula (B) or formula (C) below:

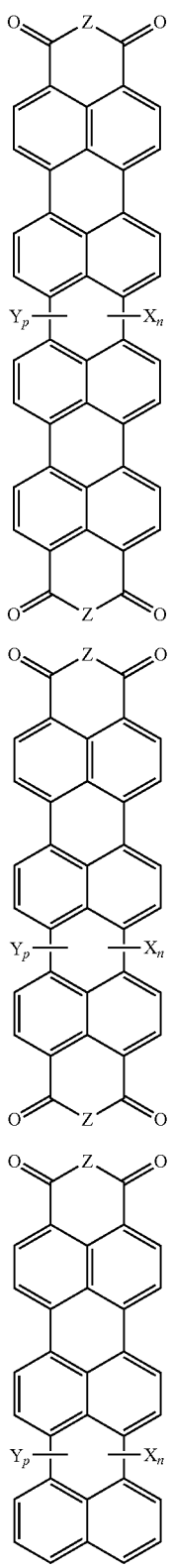

wherein:

the groups Z, the same or different from each other, represent O, S or N—R, provided that in the above formulae the unit —CO—Z—CO— (in the case of formula (A) or formula (B) one or both units of formula —CO—Z—CO—) may be replaced by a unit —CS—Z—CO—, or a unit —CS—Z—CS—, or by [—COOH HOOC—] (i.e., the dicarboxylic acid instead of the cyclic anhydride) and further provided that for Z=N—R a unit —CO—Z—CO— may be replaced by a unit of formula —C(=NR')—NR—CO—;

R and R' independently represent an optionally substituted aliphatic, cycloaliphatic, aromatic, heteroaromatic, alkylaryl, alkylheteroaryl, arylalkyl or heteroarylalkyl group having from 1 to about 20 carbon atoms; and R and R' may also be combined to form, together with the N atoms to which they are attached, an optionally substituted and/or fused 5- to 7-membered ring;

the groups X may be the same or different and represent halogen, COOH, and isocyanate (NCO);

the groups Y may be the same or different and are selected from OH, $NO_2$, CN, groups of formula R", OR", COOR", OCOR", CONHR", CO(NR")$_2$, OCONHR", OCO(NR")$_2$, COR", $SO_3$H, $SO_3$R", $SO_2$NHR", $SO_2$N(R")$_2$, NHCOR", NRCOR", NHCOOR", NRCOOR", $NHSO_2$R", $NRSO_2$R", NHR", and N(R")$_2$, wherein the groups R" may be the same or different and represent an optionally substituted aliphatic, cycloaliphatic, aromatic, heteroaromatic, alkylaryl, alkylheteroaryl, arylalkyl or heteroarylalkyl group having from 1 to about 20 carbon atoms and, where two groups R" are present, may also be combined to form, together with the N atom to which they are attached, an optionally substituted and/or fused 5- to 7-membered ring;

n and p each represent 0 or an integer of from 1 to 8 (i.e., 1, 2, 3, 4, 5, 6, 7 or 8), provided that (n+p) is not higher than 8 and further provided that for n=0 at least one of R, R' and R" comprises at least one group X as substituent.

In one aspect of the compounds of the above formulae, the (only) group Z or at least one of the groups Z represents N—R wherein R may be selected, for example, from optionally substituted alkyl having from 1 to about 6 carbon atoms, optionally substituted alkylaryl or arylalkyl having from 7 to about 12 carbon atoms, optionally substituted aryl having from about 6 to about 20 carbon atoms, and optionally substituted heteroaryl having from about 3 to about 20 carbon atoms such as, e.g., from optionally substituted alkyl having from 1 to about 4 carbon atoms, optionally substituted phenyl, or optionally substituted benzyl. By way of non-limiting example, R may represent phenyl substituted with from 1 to about 3 groups selected from halogen and alkyl having from 1 to about 6 carbon atoms such as, e.g., a phenyl group substituted by at least two alkyl groups which comprise a secondary or tertiary carbon atom, examples of which include isopropyl and tert.-butyl groups.

In another aspect of the compounds of the above formulae, the quaterrylene and/or terrylene dye may be a compound of formula (C). Alternatively, the quaterrylene and/or terrylene dye may be a compound of formula (A) or formula (B) such as, e.g., a compound of formula (A) or formula (B) wherein the groups Z may be the same or different and represent O or N—R (including compounds wherein both groups Z are O, compounds wherein both groups Z are N—R (with the groups R being the same or different), and compounds wherein one group Z is O and the other group Z is N—R).

The present invention also provides a quaterrylene and/or terrylene dye whose solubility and/or dispersibility in a polar liquid medium has been increased by having been bonded to a polymer, as well as a polymer-bonded quaterrylene and/or terrylene dye of formula (A) or formula (B) or formula (C):

(A)

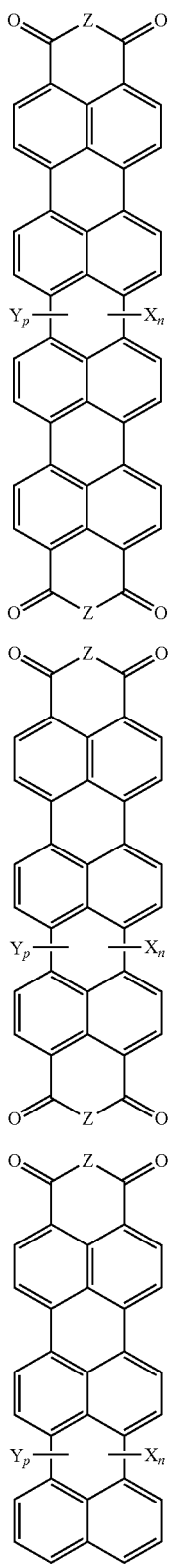

wherein
the groups Z, the same or different from each other, represent O, S or N—R, provided that the unit —CO—Z—CO— (in the case of formula (A) or formula (B) one unit or both units) may be replaced by —CS—Z—CO— or a unit —CS—Z—CS—, or may be replaced by [—COOH HOOC—] (i.e., the dicarboxylic acid instead of the anhydride) and further provided that for Z=N—R a unit —CO—Z—CO— may be replaced by a unit of formula —C(=NR')—NR—CO—;

R and R' independently represent an optionally substituted aliphatic, cycloaliphatic, aromatic, heteroaromatic, alkylaryl, alkylheteroaryl, arylalkyl or heteroarylalkyl group having from 1 to about 20 carbon atoms; and R and R' may be combined to form, together with the N atoms to which they are attached, an optionally substituted and/or fused 5- to 7-membered ring;

the groups X may be the same or different and represent halogen, isocyanate and COOH, with the proviso that at least one group X (which may be the only group X) represents a group of formula -L-P wherein L represents a covalent (direct) bond or a bridging group and P represents a polymer molecule;

the groups Y may be the same or different and are selected from OH, $NO_2$, CN, groups of formula R", OR", COOR", OCOR", CONHR", CO(NR")$_2$, OCONHR", OCO(NR")$_2$, COR", $SO_3H$, $SO_3R$", $SO_2NHR$", $SO_2N(R")_2$, NHCOR", NRCOR", NHCOOR", NRCOOR", $NHSO_2R$", $NRSO_2R$", NHR", and N(R")$_2$, wherein the groups R" may be the same or different and represent an optionally substituted aliphatic, cycloaliphatic, aromatic, heteroaromatic, alkylaryl, alkylheteroaryl, arylalkyl or heteroarylalkyl group having from 1 to about 20 carbon atoms and, where two groups R" are present, may also be combined to form, together with the N atom to which they are attached, an optionally substituted and/or fused 5- to 7-membered ring;

n and p each represent 0 or an integer of from 1 to 8 (i.e., 1, 2, 3, 4, 5, 6, 7 or 8), provided that (n+p) is not higher than 8 and further provided that for n=0 at least one of R, R' and R" comprises at least one group X as substituent.

In one aspect of the polymer-bonded quaterrylene and/or terrylene dye of the present invention, the (only) group Z or at least one of the groups Z (in the case of formula (A) and formula (B)) represents N—R wherein R may be selected, for example, from optionally substituted alkyl having from 1 to about 6 carbon atoms, optionally substituted alkylaryl or arylalkyl having from 7 to about 12 carbon atoms, optionally substituted aryl having from about 6 to about 20 carbon atoms, and optionally substituted heteroaryl having from about 3 to about 20 carbon atoms such as, e.g., from optionally substituted alkyl having from 1 to about 4 carbon atoms, optionally substituted phenyl, or optionally substituted benzyl. By way of non-limiting example, R may represent phenyl substituted with from 1 to about 3 groups selected from halogen and alkyl having from 1 to about 6 carbon atoms such as, e.g., a phenyl group substituted by at least two alkyl groups which comprise a secondary or tertiary carbon atom, non-limiting examples of which include isopropyl and tert.-butyl groups.

In another aspect of the polymer-bonded quaterrylene and/or terrylene dye of the present invention, the quaterrylene and/or terrylene dye may be a compound of formula (A) or formula (B) or formula (C). Alternatively, the polymer-bonded quaterrylene and/or terrylene dye may be a compound of formula (A) or formula (B) such as, e.g., a compound of formula (A) or formula (B) wherein the groups Z may be the same or different and represent O or N—R (including compounds wherein both groups Z are O, compounds wherein both groups Z are N—R (the groups R being the same or different) and compounds wherein one group Z is O and the other group Z is N—R).

In yet another aspect of the polymer-bonded quaterrylene and/or terrylene dye of the present invention, L may be selected from O, C(=O)O, OC(=O), C(=O)NH, NHC(=O)O, NHC(=O)NH and C(=O)—O—C(=O). For example, L may represent O.

In a still further aspect of the polymer-bonded quaterrylene and/or terrylene dye of the present invention, P may represent a polymer molecule that comprises at least one (recurring)

monomer unit that comprises at least one polar group such as, e.g., at least one polar group selected from hydroxy, carboxy and amino groups. By way of non-limiting example, the polymer may comprise a phenolic resin such as, e.g., a phenolic resin of formula

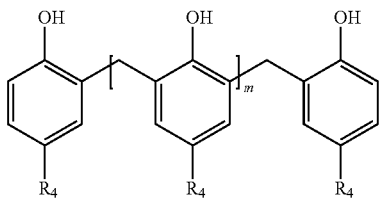

(D)

wherein the groups $R_4$ may be the same or different and are selected from alkyl groups having from 1 to about 10 carbon atoms and the average number of m is from about 1 to about 30, for example, from about 1 to about 25, from about 1 to about 15, from about 1 to about 10, from about 1 to about 5, from about 1 to about 3, from about 5 to about 15, from about 5 to about 10, from about 10 to about 20, or from about 20 to about 30. The groups $R_4$ may be the same or different (preferably the same) and may, for example, be selected from tert-butyl, tert-octyl and branched nonyl. Further, a group $R_4$ may be in the meta- or para-position with respect to the OH group (in formula (D) only the para position is shown), and there may be more than one group $R_4$ (e.g., 2 or 3 groups $R_4$) present on a phenyl ring. For example, if two groups $R_4$ are present on a phenyl ring (the same or different, preferably the same groups $R_4$) they may be present in any of the available positions on the phenyl ring, such as, e.g., meta/para or meta/meta.

In another aspect of the polymer-bonded quaterrylene and/or terrylene dye of the present invention, P may have one or more than one quaterrylene and/or terrylene dye molecule bonded thereto.

The present invention also provides a process for making a polymer-bonded quaterrylene and/or terrylene dye as set forth above (including the various aspects thereof). The process comprises contacting at least one quaterrylene and/or terrylene dye of formulae (A) to (C):

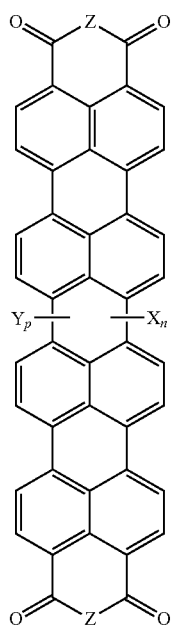

(A)

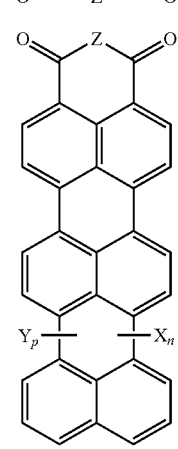

(B)

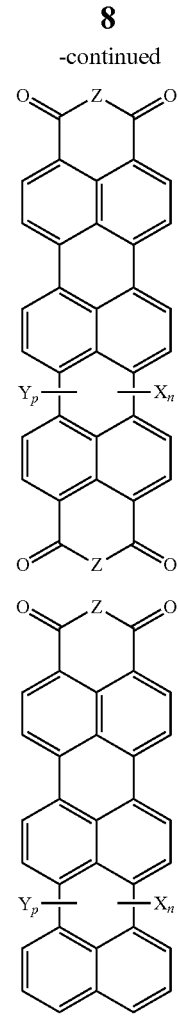

(C)

wherein the groups Z, the same or different from each other, represent O, S or N—R, provided that the unit —CO—Z—CO—(in the case of formula (A) or formula (B) one or both units) may be replaced by —CS—Z—CO— or a unit —CS—Z—CS—, or may be replaced by [—COOH HOOC—] (i.e., the dicarboxylic acid instead of the anhydride) and that for Z=N—R the unit —CO—Z—CO— may be replaced by a unit of formula —C(=NR')—NR—CO—;

R and R' in the above formulae (A) and (B) and (C) independently represent an optionally substituted aliphatic, cycloaliphatic, aromatic, heteroaromatic, alkylaryl, alkylheteroaryl, arylalkyl or heteroarylalkyl group having from 1 to about 20 carbon atoms; and R and R' may also be combined to form, together with the N atoms to which they are attached, an optionally substituted and/or fused 5- to 7-membered ring;

the groups X may be the same or different and represent halogen, isocyanate and COOH;

the groups Y may be the same or different and are selected from OH, $NO_2$, CN, groups of formula R", OR", COOR", OCOR", CONHR", CO(NR")$_2$, OCONHR", OCO(NR")$_2$, COR", $SO_3H$, $SO_3R"$, $SO_2NHR"$, $SO_2N(R")_2$, NHCOR", NRCOR", NHCOOR", NRCOOR", $NHSO_2R"$, $NRSO_2R"$, NHR", and $N(R")_2$, wherein the groups R" may be the same or different and represent an optionally substituted aliphatic, cycloaliphatic, aromatic, heteroaromatic, alkylaryl, alkylheteroaryl, arylalkyl or heteroarylalkyl group having from 1 to about 20 carbon atoms and may also be combined to form, together with the N atom to which they are attached, an optionally substituted and/or fused 5- to 7-membered ring;

n and p each represent 0 or an integer of from 1 to 8 (i.e., 1, 2, 3, 4, 5, 6, 7 or 8), provided that (n+p) is not higher than 8, and further provided that for n=0 at least one of R, R' and R" comprises at least one group X as substituent;

with a polymer P under conditions which cause a reaction of a (at least one) group X of the quaterrylene and/or terrylene dye with a functional group of the polymer to covalently bind the polymer to the quaterrylene and/or terrylene dye.

In one aspect of the process, a group X of the quaterrylene and/or terrylene dye that represents halogen may be caused to react with an OH group of the polymer P to replace X by a group —O—P. For example, the OH group of the polymer may be a phenolic OH group.

In another aspect of the process of the present invention, the process may be carried out in the presence of a base.

The present invention also provides a polymer-bonded quaterrylene and/or terrylene dye of one of formulae (I) to (IX):

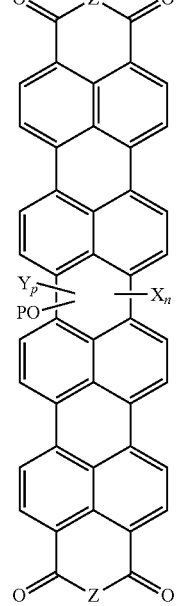  (I)

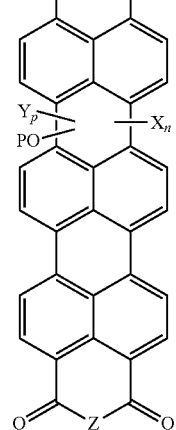  (II)

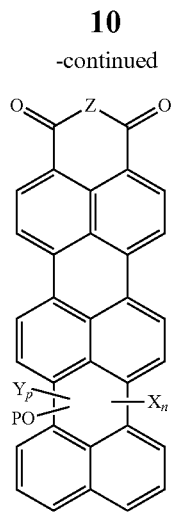  (III)

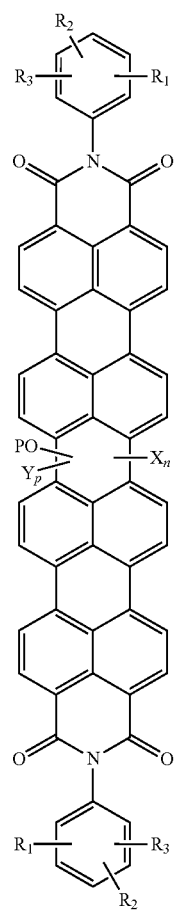  (IV)

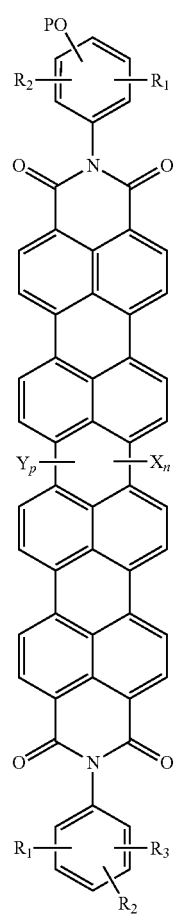
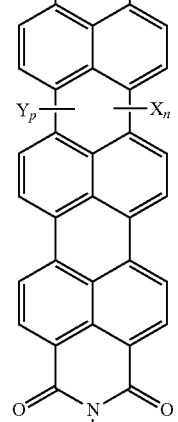
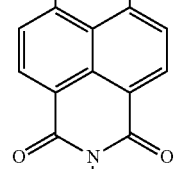

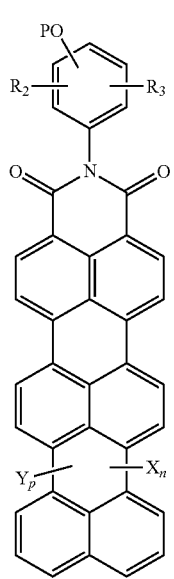

(IX)

wherein the groups Z, the same or different from each other, represent O, S or N—R, provided that in the above formulae the unit —CO—Z—CO— (in the case of formula (I) or (II) one or both units of formula —CO—Z—CO—) may be replaced by a unit —CS—Z—CO—, or a unit —CS—Z—CS—, or by [—COOH HOOC—] (i.e., the dicarboxylic acid instead of the cyclic anhydride) and further provided that for Z=N—R a unit —CO—Z—CO— may be replaced by a unit of formula —C(=NR')—NR—CO—;

R and R' independently represent an optionally substituted aliphatic, cycloaliphatic, aromatic, heteroaromatic, alkylaryl, alkylheteroaryl, arylalkyl or heteroarylalkyl group having from 1 to about 20 carbon atoms; and R and R' may be combined to form, together with the N atoms to which they are attached, an optionally substituted and/or fused 5- to 7-membered ring;

$R_1$, $R_2$ and $R_3$ are independently selected from hydrogen, optionally substituted $C_1$-$C_4$ alkyl, optionally substituted $C_1$-$C_4$ alkyl-COOH, optionally substituted $C_1$-$C_4$ alkyl-$SO_3H$, optionally substituted $C_1$-$C_4$ alkoxy, optionally substituted mono($C_1$-$C_4$)alkylamino, optionally substituted di($C_1$-$C_4$)alkylamino, optionally substituted $C_1$-$C_4$ aminoalkyl, halogen, cyano, nitro, and $SO_3H$;

the groups X may be the same or different and represent halogen, isocyanate and COOH;

the groups Y may be the same or different and are selected from OH, $NO_2$, CN, groups of formula R", OR", COOR", OCOR", CONHR", CO(NR")$_2$, OCONHR", OCO(NR")$_2$, COR", $SO_3H$, $SO_3R$", $SO_2NHR$", $SO_2N(R")_2$, NHCOR", NRCOR", NHCOOR", NRCOOR", $NHSO_2R$", $NRSO_2R$", NHR", and $N(R")_2$, wherein the groups R" may be the same or different and represent an optionally substituted aliphatic, cycloaliphatic, aromatic, heteroaromatic, alkylaryl, alkylheteroaryl, arylalkyl or heteroarylalkyl group having from 1 to about 20 carbon atoms and, where two groups R" are present, may also be combined to form, together with the N atom to which they are attached, an optionally substituted and/or fused 5- to 7-membered ring;

in the case of formulae (V), (VII) and (IX) n and p each represent 0 or an integer of from 1 to 8 (i.e., 1, 2, 3, 4, 5, 6, 7 or 8), provided that (n+p) is not higher than 8; and in the case of the remaining formulae n and p each represent 0 or an integer of from 1 to 7 (i.e., 1, 2, 3, 4, 5, 6 or 7), provided that (n+p) is not higher than 7.

P represents a polymer molecule.

In one aspect of the above polymer-bonded quaterrylene and/or terrylene dye, P may represent a polymer molecule that comprises at least one monomer unit that comprises at least one polar group such as, e.g., a group selected from hydroxy, carboxy and amino groups. By way of non-limiting example, the polymer may comprise a phenolic resin such as, e.g., a resin of formula

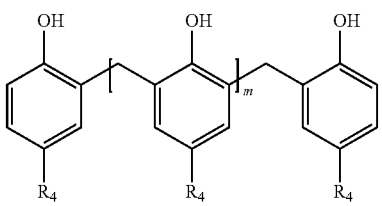

(D)

wherein the groups $R_4$ may be the same or different and are selected from alkyl groups having from 1 to about 10 carbon atoms and the average number of m is from about 1 to about 30, for example, from about 1 to about 25, from about 1 to about 15, from about 1 to about 10, from about 1 to about 5, from about 1 to about 3, from about 5 to about 15, from about 5 to about 10, from about 10 to about 20, or from about 20 to about 30. The groups $R_4$ may be the same or different (preferably the same) and may, for example, be selected from tert-butyl, tert-octyl and branched nonyl. Further, a group $R_4$ may be in the meta- or para-position with respect to the OH group (in formula (D) only the para position is shown), and there may be more than one group $R_4$ (e.g., 2 or 3 groups $R_4$) present on a phenyl ring. For example, if two groups $R_4$ are present on a phenyl ring (the same or different, preferably the same groups $R_4$) they may be present in any of the available positions on the phenyl ring, such as, e.g., meta/para or meta/meta.

In another aspect of the above polymer-bonded quaterrylene and/or terrylene dye, P may have one or more than one quaterrylene and/or terrylene dye molecule (e.g., 1, 2, 3, 4, 5, 6, or more quaterrylene and/or terrylene dye molecules) bonded thereto. In this regard, it is to be noted that if two or more quaterrylene and/or terrylene dye molecules are bonded to a polymer molecule P, the two or more dye molecules may consist of at least two identical or different quaterrylene dye molecules, at least two identical or different terrylene dye molecules, and at least one quaterrylene dye molecule and at least one terrylene dye molecule. Conversely, a quaterrylene or terrylene dye molecule may have one or more than one polymer molecule P (e.g., 1, 2, 3, 4 or more polymer molecules P) bonded thereto. Even further, a polymer molecule P may have at least two quaterrylene and/or terrylene dye molecules bonded thereto, at least one of these quaterrylene and/or terrylene dye molecules being bonded to at least one additional polymer molecule P (which in turn may or may not be bonded to one or more additional quaterrylene and/or terrylene dye molecules).

In yet another aspect, in the above polymer-bonded quaterrylene and/or terrylene dye molecules of formulae (IV) to (IX) $R_1$, $R_2$, and $R_3$ may independently be selected from hydrogen, $C_1$-$C_4$ alkyl, $C_1$-$C_4$ alkoxy, halogen, and $SO_3H$ and/or the quaterrylene and/or terrylene dye molecules may be compounds of formulae (IV) to (IX) wherein (n+p) is 1, 2 or 3 and X represents Cl or Br, or wherein (n+p) is 0 and/or $R_1$ and $R_2$ are selected from $C_1$-$C_4$ alkyl groups. Even further, the quaterrylene and/or terrylene dye molecules may be compounds of formulae (IV) to (IX) where $R_3$ represents hydrogen, or compounds of formulae (IV) to (IX) wherein $R_1$ represents $SO_3H$ and $R_2$ and $R_3$ represent hydrogen.

The present invention also provides a process for making a polymer-bonded quaterrylene and/or terrylene dye of any one of formulae (I) to (IX) set forth above. The process comprises contacting a compound of formula (I') to (IX'):
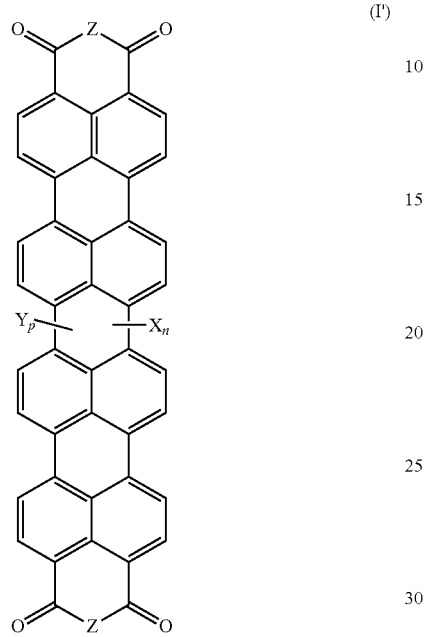
(I')
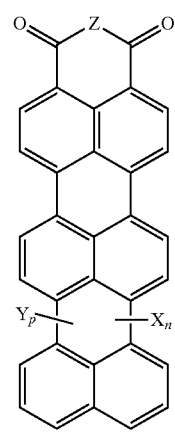
(III')
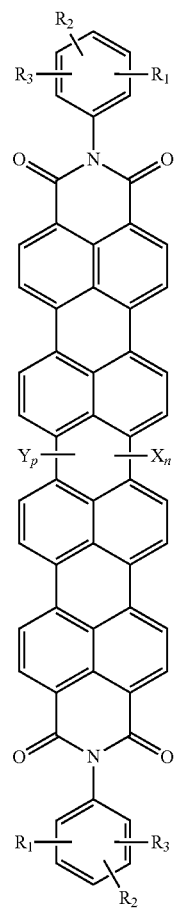
(IV')
(II')

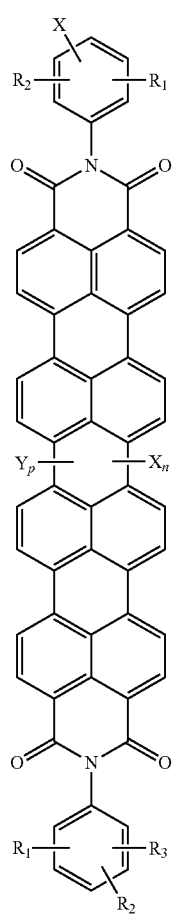
(V')
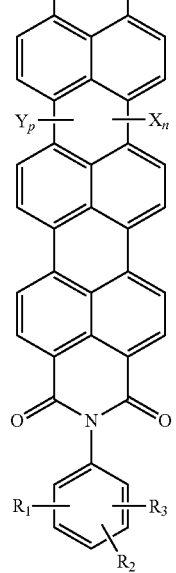
(VI')
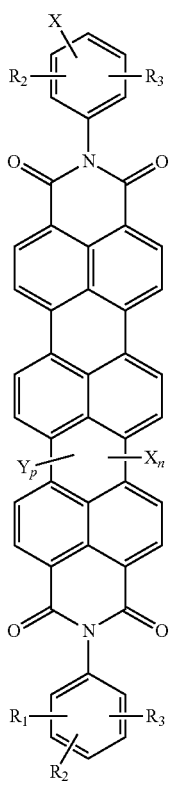
(VII')
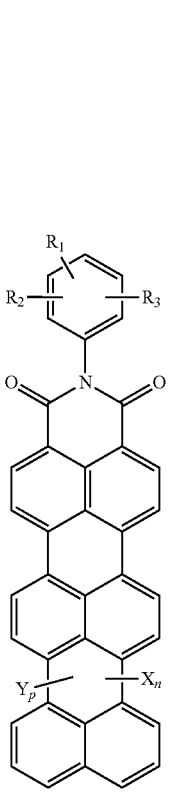
(VIII')

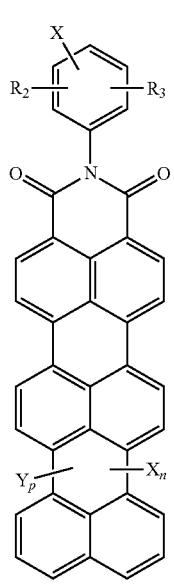

(IX')

wherein $R_1$, $R_2$, $R_3$, X and Y are as defined above for formulae (IV') to (IX') and n is at least 1 and (n+p) is 1, 2, 3, 4, 5, 6, 7 or 8,
with a polymer P, i.e., a polymer molecule which comprises a group that is capable of reacting with X to replace X by a group of formula OP.

In one aspect, the process may be carried out in a polar aprotic organic solvent in which the polymer P is soluble. For example, the polar solvent may comprise at least one of N-methylpyrrolidone, dimethyl formamide, dimethyl acetamide, and dimethylsulfoxide.

In another aspect, the process may be carried out in the presence of an inorganic base and/or a strong organic non-nucleophilic base and/or in the presence of at least one antifoam agent such as a polyethylene glycol and/or a derivative thereof.

In yet another aspect of the process, about 0.5 g to about 10 g of quaterrylene and/or terrylene dye may be employed per 100 g of polymer P. In yet another aspect of the process, from about 0.2 g to about 10 g of quaterrylene and/or terrylene dye may be employed per 100 g of polymer P, for example at least about 0.4 g, at least about 0.5 g, at least about 0.6 g, at least about 0.8 g, at least about 1 g, at least about 2 g, at least about 5 g, or at least about 8 g of quaterrylene and/or terrylene dye per 100 g of polymer P.

The present invention also provides a printing ink composition which comprises a polar liquid medium that has at least one polymer-bonded quaterrylene and/or terrylene dye of the present invention as set forth above (including the various aspects thereof) dissolved or dispersed therein.

In one aspect, the printing ink composition may comprise from about 0.01% to about 40% by weight of the at least one polymer-bonded quaterrylene and/or terrylene dye based on the total weight of the composition. In another aspect, the printing ink composition may further comprise at least one conductivity imparting substance (e.g., a salt).

The present invention also provides a marking or security feature which is made with the printing ink composition of the present invention as set forth above (including the various aspects thereof).

In one aspect, the marking or security feature may comprise at least one polymer-bonded quaterrylene and/or terrylene dye according to the present invention, e.g. a polymer-bonded quaterrylene and/or terrylene dye of formula (A) or formula (B) or formula (C) and/or of any one of formulae (I) to (IX) as set forth above (including the various aspects thereof). In another aspect, the marking or security feature may comprise at least one of a thread, a label, a barcode, a 2D code, a pattern, indicia, and a data matrix.

The present invention also provides an article which comprises the marking or security feature of the present invention as set forth above (including the various aspects thereof).

In one aspect of the article, the marking or security feature may be present on the article in the form a layer. In another aspect, the article may be at least one of a label such as, e.g., a tax label, packaging, a can, a metal, an aluminum foil, a cartridge, a closed cartridge (e.g., a capsule) that contains, e.g., a pharmaceutical, a nutraceutical, a foodstuff or a beverage (such as, e.g., coffee, tea, milk, chocolate, etc.), an article made of glass, an article made of ceramic, a banknote, a stamp, a security document, an identity card, a passport, a driver's license, a credit card, an access card, a ticket such as, e.g., a transportation ticket or an event ticket, a voucher, a value document, an ink-transfer film, a reflective film, a thread, and a commercial good.

The present invention further provides a method of authenticating an article. The method comprises providing the article with the marking or security feature of the present invention as set forth above and/or the application onto the article the printing ink composition of the present invention as set forth above.

In one aspect of the method, the article may be at least one of a tax label, packaging, a can, a metal, an aluminum foil, a cartridge, a closed cartridge (e.g., a capsule) that contains, e.g., a pharmaceutical, a nutraceutical, a foodstuff or a beverage (such as, e.g., coffee, tea, milk, chocolate, etc.), an article made of glass, an article made of ceramic, a banknote, a stamp, a security document, an identity card, a passport, a driver's license, a credit card, an access card, a ticket such as, e.g., a transportation ticket or an event ticket, a voucher, a value document, an ink-transfer film, a reflective film, a thread, and a commercial good.

The present invention also provides a dye-doped polymer which is obtainable by a method according to the present invention as set forth above (including the various aspects thereof). In this polymer at least about 0.1% to 10% of all polymer molecules have bonded thereto a quaterrylene and/or or terrylene dye.

In one aspect, the polymer may comprise a phenolic resin such as, e.g., a phenolic resin of formula

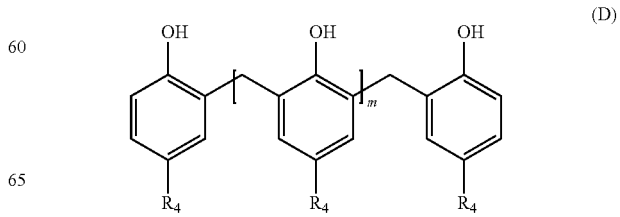

(D)

wherein the groups $R_4$ may be the same or different and are selected from alkyl groups having from 1 to about 10 carbon atoms and the average number of m is from about 1 to about 30, for example, from about 1 to about 25, from about 1 to about 15, from about 1 to about 10, from about 1 to about 5, from about 1 to about 3, from about 5 to about 15, from about 5 to about 10, from about 10 to about 20, or from about 20 to about 30. The groups $R_4$ may be the same or different (preferably the same) and may, for example, be selected from tert-butyl, tert-octyl and branched nonyl. Further, a group $R_4$ may be in the meta- or para-position with respect to the OH group (in formula (D) only the para position is shown), and there may be more than one group $R_4$ (e.g., 2 or 3 groups $R_4$) present on a phenyl ring. For example, if two groups $R_4$ are present on a phenyl ring (the same or different, preferably the same groups $R_4$) they may be present in any of the available positions on the phenyl ring, such as, e.g., meta/para or meta/meta.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description making apparent to those skilled in the art how the several forms of the present invention may be embodied in practice.

As set forth above, the quaterrylene and/or terrylene dyes which in accordance with the present invention are to be bonded to a polymer may be of formulae (A) or (B) or (C):

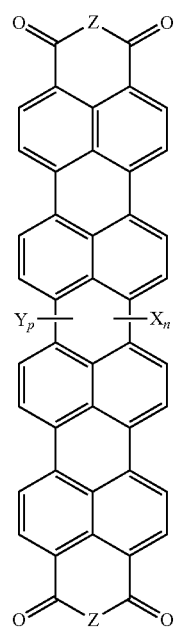

(A)

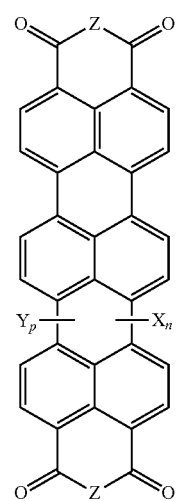

(B)

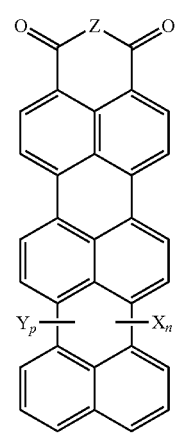

(C)

In the above formulae (A), (B) and (C) the groups Z may represent O, S or N—R. Additionally, the unit or units —CO—Z—CO— may independently be replaced by a unit —CS—Z—CO—, or a unit —CS—Z—CS—, or by the corresponding dicarboxylic acid. Further, for Z=N—R the unit —CO—Z—CO— may further be replaced by a unit of formula —C(=NR')—NR—CO—. In the case of formula (A) and formula (B) the two units —CO—Z—CO— may be the same or different. If these units are different, one of the units may, for example, be —CO—O—CO— and the other one may be —CO—NR—CO—, or one may be —CO—NR—CO— and the other one may be —C(=NR')—NR—CO, or may be —CS—O—CS—, or one unit may be —CO—NR—CO— and the other one may be —CO—NR*—CO—, with R and R* being different from each other, etc. (R* having the same meanings as R).

The groups R and R' in the above formulae independently represent an optionally substituted aliphatic, cycloaliphatic, aromatic, heteroaromatic, alkylaryl, alkylheteroaryl, arylalkyl or heteroarylalkyl group having from 1 to about 20 carbon atoms. Additionally, R and R' may be combined to form, together with the N atoms to which they are attached, an optionally substituted and/or fused 5- to 7-membered ring.

Regarding the meanings of the groups R, R', R", $R_1$, $R_2$, $R_3$ and $R_4$ mentioned herein, the following applies throughout the present specification and the appended claims (it being understood that throughout the present specification and the appended claims the indicated number of carbon atoms invariably refers to the respective unsubstituted group):

An "optionally substituted alkyl" group includes linear and branched alkyl groups which preferably have from 1 to about 12 carbon atoms, e.g., from 1 to about 8 carbon atoms, from 1 to about 6 carbon atoms, or from 1 to about 4 carbon atoms. Specific non-limiting examples thereof include methyl, ethyl, n-propyl, isopropyl, n-butyl, isobutyl, tert-butyl, sec-butyl, linear or branched pentyl (e.g., 2-methylbutyl, 2-ethylpropyl and 2,2-dimethylpropyl), linear or branched hexyl (e.g., 2-ethylbutyl, 3-ethylbutyl, 2,2-dimethylbutyl, 3,3-dimethylbutyl, and 2,3-dimethylbutyl), linear or branched heptyl, linear or branched octyl (e.g., 2-ethylhexyl), and linear or branched nonyl. The alkyl groups may be substituted with one or more substituents (e.g., one, two, three, four, etc.). Non-limiting examples of these substituents include OH, halogen such as, e.g., F, Cl, Br, and I (as in, e.g., trifluoromethyl, trichloromethyl, pentafluorethyl and 2,2,2-trifluoroethyl), alkoxy having from 1 to about 6 carbon atoms, e.g., from 1 to about 4 carbon atoms, such as, e.g., methoxy, ethoxy, propoxy and butoxy, acyloxy having from 1 to about 4 carbon atoms such as, e.g., acetoxy and propionyloxy, aryloxy having from about 6 to about 10 carbon atoms such as, e.g., (optionally substituted) phenoxy, aroyloxy having from about 6 to about 10 carbon atoms such as, e.g., benzoyloxy, —COOH (including partially or completely salified forms thereof), alkoxycarbonyl having from 1 to about 4 carbon atoms in the alkyl groups such as, e.g., methoxycarbonyl and ethoxycarbonyl, —$SO_3H$, alkylsulfonyl, arylsulfonyl, alkylsulfonylamino, nitro, cyano, amino, monoalkylamino and dialkylamino wherein the alkyl groups have from 1 to about 6 carbon atoms, e.g., from 1 to about 4 carbon atoms, such as, e.g., methylamino, dimethylamino, ethylamino, diethylamino, propylamino and dipropylamino. The alkyl groups may also be substituted by one or more optionally substituted cycloalkyl groups (preferably having from 3 to about 8 ring carbon atoms) as further set forth below. Preferred substituents for the alkyl groups include F, Cl, Br, OH, methoxy, ethoxy, —COOH, —$SO_3H$, amino, methylamino, ethylamino, dimethylamino and diethylamino. If more than one substituent is present, the substituents may be the same or different. Also, one or more (e.g., one or two) of the C atoms of the alkyl group may be replaced by a heteroatom such as, e.g., O, S and NR''' (with R''' representing, for example, H or alkyl having from 1 to about 4 carbon atoms). Further, the alkyl group may have one or more carbonyl groups (C=O) incorporated therein and/or may comprise one or more carbon-carbon double and/or triple bonds (such as in, e.g., vinyl, allyl and propargyl).

An "optionally substituted cycloalkyl" group preferably comprises from about 3 to about 12 ring carbon atoms, more preferably from about 5 to about 8 ring carbon atoms such as, e.g., cyclopropyl, cyclobutyl, cyclopentyl, cyclohexyl, cycloheptyl and cyclooctyl. The cycloalkyl groups may be substituted with one or more substituents (e.g., one, two, three, four, etc). Non-limiting examples of these substituents include OH, halogen such as, e.g., F, Cl, Br, and I, alkoxy having from 1 to about 6 carbon atoms, e.g., from 1 to about 4 carbon atoms, such as, e.g., methoxy, ethoxy, propoxy and butoxy, acyloxy having from 1 to about 4 carbon atoms such as, e.g., acetoxy and propionyloxy, aryloxy having from about 6 to about 10 carbon atoms such as, e.g., (optionally substituted) phenoxy, aroyloxy having from about 6 to about 10 carbon atoms such as, e.g., benzoyloxy, —COOH (including partially or completely salified forms thereof), alkoxycarbonyl having from 1 to about 4 carbon atoms in the alkyl groups such as, e.g., methoxycarbonyl and ethoxycarbonyl, —$SO_3H$, alkylsulfonyl, arylsulfonyl, alkylsulfonylamino, nitro, cyano, amino, monoalkylamino and dialkylamino wherein the alkyl groups have from 1 to about 6 carbon atoms, e.g., from 1 to about 4 carbon atoms, such as, e.g., methylamino, dimethylamino, ethylamino, diethylamino, propylamino and dipropylamino. The cycloalkyl groups may also be substituted by one or more optionally substituted alkyl groups (preferably having from 1 to about 4 carbon atoms) as set forth above. Preferred substituents for the alkyl groups include F, Cl, Br, OH, methoxy, ethoxy, —COOH, —$SO_3H$, amino, methylamino, ethylamino, dimethylamino and diethylamino. If more than one substituent is present, the substituents may be the same or different. Further, the cycloalkyl group may have one or more carbonyl groups (C=O) incorporated therein and/or may comprise one or more carbon-carbon double bonds (such as in, e.g., cyclopentenyl and cyclohexenyl).

An "optionally substituted aryl" group and an "optionally substituted heteroaryl" group denote optionally fused aryl and heteroaryl groups which preferably comprise from about 5 to about 15 ring members, e.g., from about 6 to about 10 ring members. The heteroaryl groups will usually comprise from 1 to about 3 ring members selected from O, S and N and may be partially or fully hydrogenated. Specific examples of these aryl and heteroaryl groups include phenyl, naphthyl, anthranyl, phenanthryl, 2- or 3-furyl, 2- or 3-thienyl, 1-, 2- or 3-pyrrolyl, 1-, 2-, 4- or 5-imidazolyl, 1-, 3-, 4- or 5-pyrazolyl, 2-, 4- or 5-oxazolyl, 3-, 4- or 5-isoxazolyl, 2-, 4- or 5-thiazolyl, 3-, 4- or 5-isothiazolyl, 2-, 3- or 4-pyridyl, 2-, 4-, 5- or 6-pyrimidinyl, 1,2,3-triazol-1-, -4- or -5-yl, 1,2,4-triazol-1-, -3- or -5-yl, 1- or 5-tetrazolyl, 1,2,3-oxadiazol-4- or -5-yl, 1,2,4-oxadiazol-3- or -5-yl, 1,3,4-thiadiazol-2- or -5-yl, 1,2,4-thiadiazol-3- or -5-yl, 1,2,3-thiadiazol-4- or -5-yl, 3- or 4-pyridazinyl, pyrazinyl, 1-, 2-, 3-, 4-, 5-, 6- or 7-indolyl, indazolyl, 4- or 5-isoindolyl, 1-, 2-, 4- or 5-benzimidazolyl, 1-, 3-, 4-, 5-, 6- or 7-benzopyrazolyl, 2-, 4-, 5-, 6- or 7-benzoxazolyl, 3-, 4-, 5-, 6- or 7-benzisoxazolyl, 2-, 4-, 5-, 6- or 7-benzothiazolyl, 2-, 4-, 5-, 6- or 7-benzisothiazolyl, 4-, 5-, 6- or 7-benz-2,1,3-oxadiazolyl, 2-, 3,4-, 5-, 6-, 7- or 8-quinolyl, 1-, 3-, 4-, 5-, 6-, 7- or 8-isoquinolyl, 3-, 4-, 5-, 6-, 7- or 8-cinnolinyl, 2-, 4-, 5-, 6-, 7- or 8-quinazolinyl, 5- or 6-quinoxalinyl, 2-, 3-, 5-, 6-, 7- or 8-2H-benzo-1,4-oxazinyl, 1,3-benzodioxol-5-yl, 1,4-benzo-dioxane-6-yl, 2,1,3-benzothiadiazol-4- or -5-yl or 2,1,3-benzoxadiazol-5-yl, 2,3-dihydro-2-, -3-, -4- or -5-furyl, 2,5-dihydro-2-, -3-, -4- or -5-furyl, tetrahydro-2- or -3-furyl, 1,3-dioxolan-4-yl, tetrahydro-2- or -3-thienyl, 2,3-dihydro-1-, -2-, -3-, 4- or -5-pyrrolyl, 2,5-dihydro-1-, -2-, -3-, -4- or -5-pyrrolyl, 1-, 2- or 3-pyrrolidinyl, tetrahydro-1-, -2- or -4-imidazolyl, 2,3-dihydro-1-, -2-, -3-, -4- or -5-pyrazolyl, tetrahydro-1-, -3- or -4-pyrazolyl, 1,4-dihydro-1-, -2-, -3- or -4-pyridyl, 1,2,3,4-tetrahydro-1-, -2-, -3-, -4-, -5- or -6-pyridyl, 1-, 2-, 3- or 4-piperidinyl, 2-, 3- or 4-morpholinyl, tetrahydro-2-, -3- or -4-pyranyl, 1,4-dioxaneyl, 1,3-dioxane-2-, -4- or -5-yl, hexahydro-1-, -3- or -4-pyridazinyl, hexahydro-1-, -2-, -4- or -5-pyrimidinyl, 1-, 2- or 3-piperazinyl, 1,2,3,4-tetrahydro-1-, -2-, -3-, -4-, -5-, -6-, -7- or -8-quinolyl, 1,2,3,4-tetrahydro-1-, -2-, -3-, -4-, -5-, -6-, -7- or -8-isoquinolyl, 2-, 3-, 5-, 6-, 7- or 8-3,4-dihydro-2H-benzo-1,4-oxazinyl, 2,3-methylenedioxyphenyl, 3,4-methylenedioxyphenyl, 2,3-ethylenedioxyphenyl, 3,4-ethylenedioxyphenyl, 3,4-(difluoromethylenedioxy)phenyl, 2,3-dihydrobenzofuran-5- or -6-yl, 2,3-(2-oxomethylenedioxy) phenyl, 3,4-dihydro-2H-1,5-benzodioxepin-6- or -7-yl, 2,3-dihydrobenzofuranyl, 2,3-dihydro-2-oxofuranyl. The aryl and heteroaryl groups may be substituted with one or more (e.g., one, two, three, four, etc.) substituents which are preferably selected from halogen such as, e.g., F, Cl, Br, and I, OH, —COOH (including partially or completely salified forms thereof), —$SO_3H$, nitro, cyano, alkoxy having from 1 to about 4 carbon atoms such as, e.g., methoxy and ethoxy, aryloxy having from 1 to about 4 carbon atoms such as, e.g., acetoxy and propionyloxy, aryloxy having from about 6 to about 10 carbon atoms such as, e.g., phenoxy, aroyloxy having from about 6 to about 10 carbon atoms such as, e.g., benzoyloxy, amino, monoalkylamino and dialkylamino wherein the alkyl groups have from 1 to about 6 carbon atoms, e.g., from 1 to about 4 carbon atoms, such as, e.g., methylamino, dimethylamino, ethylamino, diethylamino, propylamino and dipropylamino, acylamino having from 1 to about 8 carbon atoms such as, e.g., acetylamino and propionylamino, aminocarbonyl, monoalkylaminocarbonyl, diaminocarbonyl and alkoxycarbonyl having from 1 to about 4 carbon atoms in the alkyl groups such as, e.g., methoxycarbonyl and ethoxycarbonyl, optionally substituted acyl having from 2 to about 8 carbon atoms such as acetyl and propionyl, alkylsulfonyl, arylsulfonyl and alkylsulfonylamino. If more than one substituent is present, the substituents may be the same or different. Also, the aryl and heteroaryl groups may be substituted by aryl groups and/or alkylaryl groups. Specific and non-limiting examples of substituted aryl groups include chlorophenyl, dichlorophenyl, fluorophenyl, bromophenyl, phenoxyphenyl, hydroxyphenyl, dihydroxyphenyl, methoxyphenyl, aminophenyl, dimethylaminophenyl and biphenylyl.

An "optionally substituted alkylaryl" group and an "optionally substituted alkylheteroaryl" group denote optionally substituted aryl groups and optionally substituted heteroaryl groups as set forth above which are (further) substituted by at least one optionally substituted alkyl group (preferably comprising from 1 to about 6, e.g., from 1 to about 4 carbon atoms) as set forth above. Specific examples thereof include tolyl, xylyl, mesityl, ethylphenyl, cumyl, trifluormethylphenyl, hydroxytolyl, chlorotolyl, methylpyridyl, methylfuryl, methylthienyl, diisopropylphenyl, di(tert-butyl)phenyl, and methylnaphthyl.

An "optionally substituted arylalkyl" group and an "optionally substituted heteroarylalkyl" group denote optionally substituted alkyl groups (preferably comprising from 1 to about 6, e.g., from 1 to about 4 carbon atoms) as set forth above which are (further) substituted by at least one optionally substituted aryl group and/or optionally substituted heteroaryl group as further set forth above. Specific examples thereof include benzyl, methylbenzyl, chlorobenzyl, dichlorbenzyl, hydroxybenzyl, 1-phenylethyl, 2-phenylethyl, pyridylmethyl, thienylmethyl, furylmethyl, and naphthylmethyl.

An "optionally substituted and/or fused 5- to 7-membered ring" denotes a saturated, partially unsaturated or aromatic N-heterocyclic ring which in addition to the one or two N atoms already present therein may comprise one or two additional heteroatoms which are selected from O, N and S. The ring will usually have five or six ring members. Also, the ring will often comprise no additional heteroatom. Further, the ring may have one or two aromatic and/or heteroaromatic rings (e.g., benzene rings) fused to it and/or may be substituted with one or more (e.g., one, two, three, four, etc.) substituents which are preferably selected from F, Cl, Br, and I, OH, —COOH (including partially or completely salified forms thereof), —SO$_3$H, cyano, nitro, alkoxy having from 1 to about 4 carbon atoms such as, e.g., methoxy and ethoxy, acyloxy having from 1 to about 4 carbon atoms such as, e.g., acetoxy and propionyloxy, aryloxy having from about 6 to about 10 carbon atoms such as, e.g., phenoxy, aroyloxy having from about 6 to about 10 carbon atoms such as, e.g., benzoyloxy, amino, monoalkylamino and dialkylamino wherein the alkyl groups have from 1 to about 6 carbon atoms, e.g., from 1 to about 4 carbon atoms, such as, e.g., methylamino, dimethylamino, ethylamino, diethylamino, propylamino and dipropylamino, acylamino having from 1 to about 8 carbon atoms such as, e.g., acetylamino and propionylamino, aminocarbonyl, monoalkylaminocarbonyl, diaminocarbonyl and alkoxycarbonyl having from 1 to about 4 carbon atoms in the alkyl groups such as, e.g., methoxycarbonyl and ethoxycarbonyl, optionally substituted acyl having from 2 to about 8 carbon atoms such as acetyl and propionyl, alkylsulfonyl, arylsulfonyl and alkylsulfonylamino, optionally substituted alkyl having from 1 to about 6 carbon atoms such as, e.g., methyl, ethyl, hydroxymethyl and hydroxyethyl, optionally substituted (hetero)aryl such as, e.g., phenyl, tolyl, xylyl, hydroxyphenyl, pyridinyl and pyrrolyl, and optionally substituted alkylaryl such as, e.g., benzyl. If more than one substituent is present, the substituents may be the same or different. Non-limiting examples of unsubstituted N-containing 5- to 7-membered rings include pyrrolyl, pyrrolidinyl, pyridinyl, pyrimidinyl, piperidinyl, morpholinyl, piperazinyl, thienyl, pyrazolyl, pyrazolidinyl, oxazolyl and oxazolidinyl Preferred halogens as meaning for X in the above formulae (A) to (C) are Cl and Br, although F and I are suitable as well.

Regarding the values for n and p in the above formulae (A) to (C) it is to be noted that the value of (n+p) will often be not higher than 8, e.g., not higher than 7, or not higher than 6, with n and p each preferably having a value of 0, 1, 2, 3 4, 5 6 7 or 8. Further, the value of p will often be 0. If n equals 0, at least one of R, R' and R" comprises at least one group X as substituent. In the latter case often only one group X will be present in R, R' or R", although it is entirely possible for two, three or more groups X to be present in R and/or R' and/or R".

If two or more groups X are present in compounds of formulae (A), (B) and (C) they may be the same or different (and preferably are the same) and may be present as substituents on the quaterrylene and/or terrylene skeleton and/or be a part of one or more of R, R' and R". However, if two or more groups X are present they will preferably be present either as substituents on the quaterrylene and/or terrylene skeleton or as a part of R and/or R'.

By way of non-limiting example and also as a preferred embodiment, compounds of general formula (IV to IX) set forth above include compounds wherein n=p=0, R$_1$=H, R$_2$=R$_3$=C$_{1-4}$ alkyl (e.g., C$_3$ alkyl such as isopropyl), and P represents a group derived from a phenolic resin of general formula (D) wherein m=1 to 4 and the groups R$_4$ are preferably identical and represent C$_{1-10}$ alkyl groups (e.g., C$_4$ alkyl such as tert.-butyl); compounds of general formula (IV to IX) set forth above include compounds wherein n=p=0, R$_1$=R$_2$=C$_{1-4}$ alkyl (e.g., C$_3$ alkyl such as isopropyl or C$_4$ alkyl such as tert.-butyl), and P represents a group derived from a phenolic resin of general formula (D) wherein m=1 and the groups R$_4$ are preferably identical and represent C$_{1-10}$ alkyl groups (e.g., C$_4$ alkyl such as tert.-butyl); and compounds of general formulae (I to III) set forth above include compounds wherein n=0 or 3, p=0, for n=3, X=halogen (such as Cl or Br), the groups Z are identical (if two groups Z are present) and represent N—R, with R being an alkylaryl group, e.g., a dialkylphenyl group wherein the two alkyl groups are preferably identical and represent C$_{1-4}$ alkyl groups (e.g., C$_3$ alkyl such as isopropyl), and P represents a group derived from a phenolic resin of general formula (D) wherein m=1 and the groups R$_4$ are preferably identical and represent C$_{1-10}$ alkyl groups (e.g., C$_4$ alkyl such as tert.-butyl).

According to the method of the present invention the solubility and/or the dispersibility of a quaterrylene and/or terrylene dye in a liquid medium is increased by (preferably covalently) binding the quaterrylene and/or terrylene dye to a (at least one) polymer that is soluble in the liquid medium. The term "soluble in the liquid medium" means that the polymer shows a more than negligible solubility in the liquid medium, such as, e.g., a solubility of at least about 0.2 g of polymer per 100 g of liquid medium, preferably at least about 1 g, e.g., at least about 2 g, at least about 5 g, or at least about 10 g of polymer per 100 g of liquid medium. If the liquid medium is a polar liquid medium (as it is often encountered in printing inks) the polymer may comprise at least one (recurring) monomer unit that comprises at least one polar group which may, for example, be selected from hydroxy, carboxy and amino groups. Accordingly, the polymer may, for example, comprise a phenolic resin such as, e.g., a novolac resin or any other kind of phenol formaldehyde condensation product. For example, the phenolic resin may be or include a phenolic resin of formula

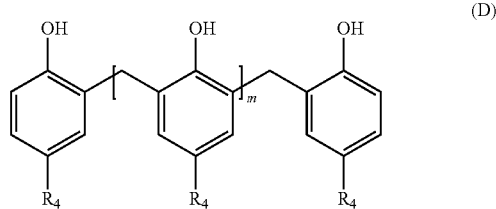

(D)

wherein the groups $R_4$ may be the same or different and are selected from (optionally substituted) alkyl groups having from 1 to about 10 carbon atoms and the average number of m is from about 1 to about 30, for example, from about 1 to about 25, from about 1 to about 15, from about 1 to about 10, from about 1 to about 5, from about 1 to about 3, from about 5 to about 15, from about 5 to about 10, from about 10 to about 20, or from about 20 to about 30. The groups $R_4$ may be the same or different (preferably the same) and may, for example, be selected from tert-butyl, tert-octyl and branched nonyl. Further, a group $R_4$ may be in the meta- or para-position with respect to the OH group (in formula (D) only the para position is shown), and there may be more than one group $R_4$ (e.g., 2 or 3 groups $R_4$) present on a phenyl ring. For example, if two groups $R_4$ are present on a phenyl ring (the same or different, preferably the same groups $R_4$) they may be present in any of the available positions on the phenyl ring, such as, e.g., meta/para or meta/meta with respect to the OH group.

Regarding formula (D), it is to be appreciated that each of the phenyl rings comprised therein may comprise 1 or 2 additional substituents. These substituents may, for example, be additional optionally substituted alkyl groups (preferably having from 1 to about 10 carbon atoms), halogen such as, e.g., F, Cl and Br, OH, COOH, and amino. If additional substituents are present they may be the same or different.

The average value of m in the above formula (D) will often be at least about 1, at least about 2, e.g., at least about 3, or at least about 4, and will also often be not higher than about 20, e.g., not higher than about 15, or not higher than about 10.

The weight ratio of quaterrylene and/or terrylene dye to polymer(s) that is employed in the method of the present invention depends on several factors such as, e.g., the molecular weights of the quaterrylene and/or terrylene dyes and the polymer(s), the average number of quaterrylene and/or terrylene dye molecules that are to be bonded to the a single polymer molecule or the average number of polymer molecules that are to be bonded to a single quaterrylene or terrylene dye molecule. In particular, in a polymer-bonded quaterrylene and/or terrylene dye of the present invention a single polymer molecule P may have one or more than one quaterrylene and/or terrylene dye molecule (e.g., an average of 1, 2, 3, 4, 5, 6, or more quaterrylene and/or terrylene dye molecules) bonded thereto. Conversely, a quaterrylene and/or terrylene dye molecule may have one or more than one polymer molecule P (e.g., an average of 1, 2, 3, 4, or more polymer molecules P) bonded thereto. Even further, a polymer molecule P may have at least two quaterrylene and/or terrylene dye molecules bonded thereto, at least one of these quaterrylene and/or terrylene dye molecules being bonded to at least one additional polymer molecule P (which in turn may or may not be bonded to one or more additional quaterrylene and/or terrylene dye molecules). As noted above, if two of more dye molecules are bonded to a polymer molecule P, they may be identical or different, i.e., the same or different quaterrylene molecules, the same of different terrylene molecules, at least one quaterrylene molecule and at least one terrylene molecule. Of course, mixtures of polymer molecules which are different in terms of the number and/or type of dye molecules bonded thereto are also within the scope of the present invention.

It is further possible (and sometimes preferred) to employ a relatively large stoichiometric excess of polymer(s) with respect to quaterrylene and/or terrylene dye. This will result in a polymer wherein only a small fraction (e.g., not more than about 0.1%, not more than about 0.5%, not more than about 1%, or not more than about 2%, not more than about 4%, not more than about 6%, not more than about 8%, not more than about 10%) of the polymer molecules has at least one quaterrylene and/or terrylene dye molecule bonded thereto, thereby affording a quaterrylene and/or terrylene dye-doped polymer of the present invention. The quaterrylene and/or terrylene dye-doped polymer can be used for the same purposes for which the polymer-bonded quaterrylene and/or terrylene dye of the present invention is employable such as, e.g., as a component of a printing ink composition.

By way of non-limiting example, in the process for making the polymer-bonded quaterrylene and/or terrylene dyes of formulae (I) to (IX) set forth above it is preferred to use about 0.5 g to about 10 g of quaterrylene and/or terrylene dye per 100 g of polymer such as, e.g., phenolic resin. In particular, it will often be advantageous to employ at least about 0.8 g, e.g., at least about 1 g, but not more than about 5 g, e.g., not more than about 3 g, or not more than about 2 g of quaterrylene and/or terrylene dye per 100 g of polymer.

It is, of course, possible to react one quaterrylene and/or terrylene dye with more than one or more than one type of polymer. By way of non-limiting example, one or more quaterrylene and/or terrylene dyes of the above formulae (A) or (B) or (C) may be reacted with a mixture of polymers of the above formula (D). Conversely, two or more different quaterrylene and/or terrylene dyes may be reacted with (bonded to) a single (type of) polymer. Finally, two or more different quaterrylene and/or terrylene dyes may be reacted with two or more different (types of) polymers, although this will usually result in difficult to control reaction mixtures.

The reaction conditions which are required or advantageous, respectively for the reaction between a quaterrylene and/or terrylene dye and a polymer to which the former is to be bonded depend on many factors such as, e.g., the groups that are to participate in the reaction and any other (reactive) groups that may be present in the quaterrylene and/or terrylene dye and/or the polymer. Reaction conditions which are suitable for a specific pair of reactive groups in the quaterrylene and/or terrylene dye and in the polymer are well known to those of skill in the art. For example, especially in cases where a nucleophilic substitution is involved it will often be beneficial to carry out the reaction in an aprotic polar organic solvent such as, e.g., N-methylpyrrolidone (NMP), dimethyl formamide, dimethyl acetamide, and dimethylsulfoxide or a mixture of two or more thereof, and in the presence of an inorganic or strong non-nucleophilic organic base. Examples of inorganic and organic bases suitable for catalyzing nucleophilic substitution reactions are well known to those of skill in the art. An example of a suitable inorganic base is $K_2CO_3$. Reaction temperatures will often range from about 50° C. to about 140° C., also depending on the boiling point of the solvent used. It further will often be desirable to employ an anti-foam agent such as, e.g., a polyethylene glycol or derivative thereof. The reaction product (polymer-bonded quaterrylene and/or terrylene dye) can usually be isolated from the resultant reaction mixture and optionally purified by conventional means such as, e.g., filtration, centrifugation, extraction, chromatographic methods, etc.

Typical (non-limiting) reactions between a quaterrylene and/or terrylene dye and a polymer (phenolic resin) in accordance with the processes of the present invention are represented below:

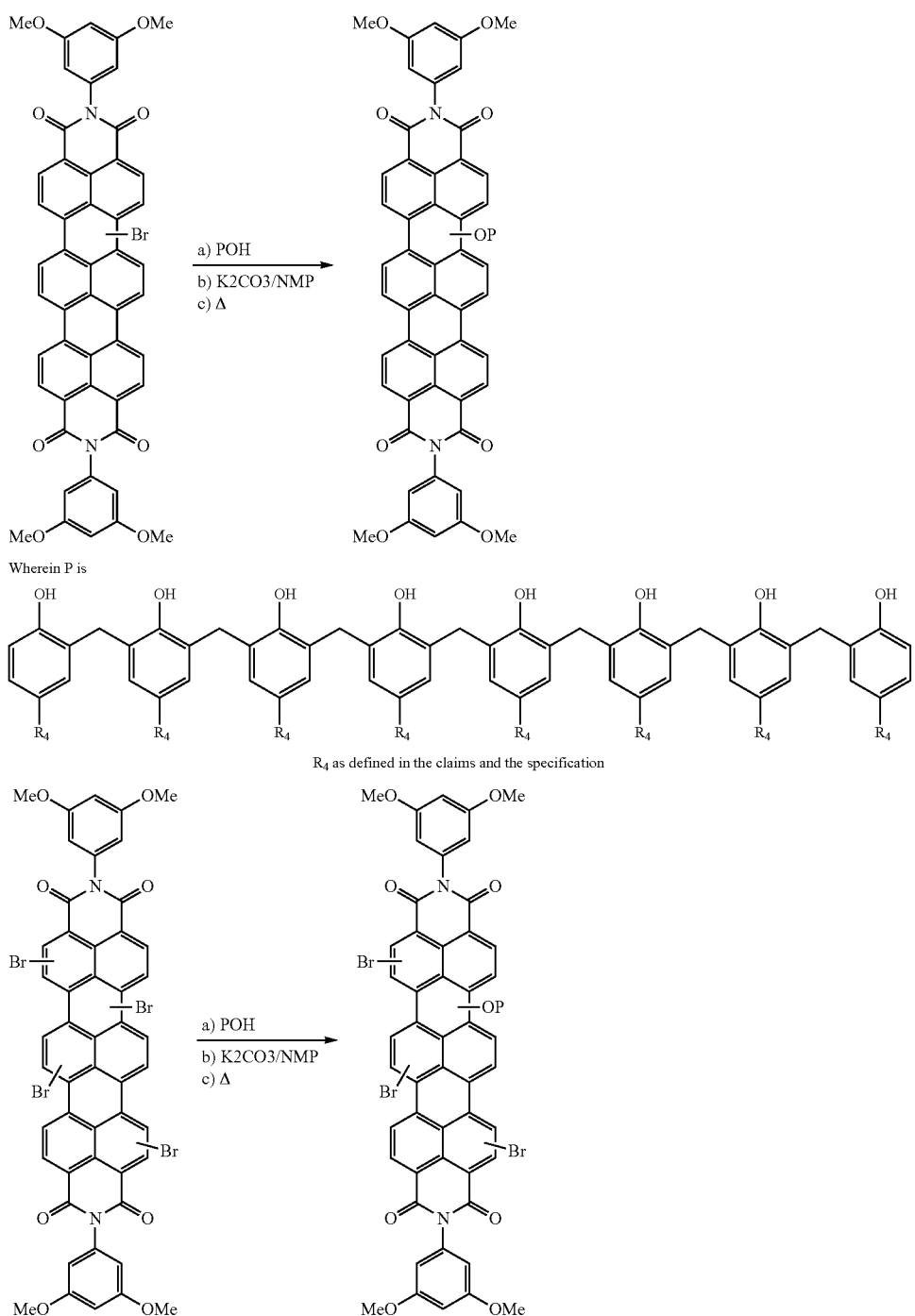

Wherein P is

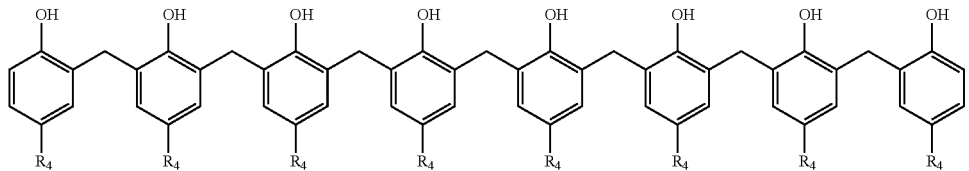

R4 as defined in the claims and the specification

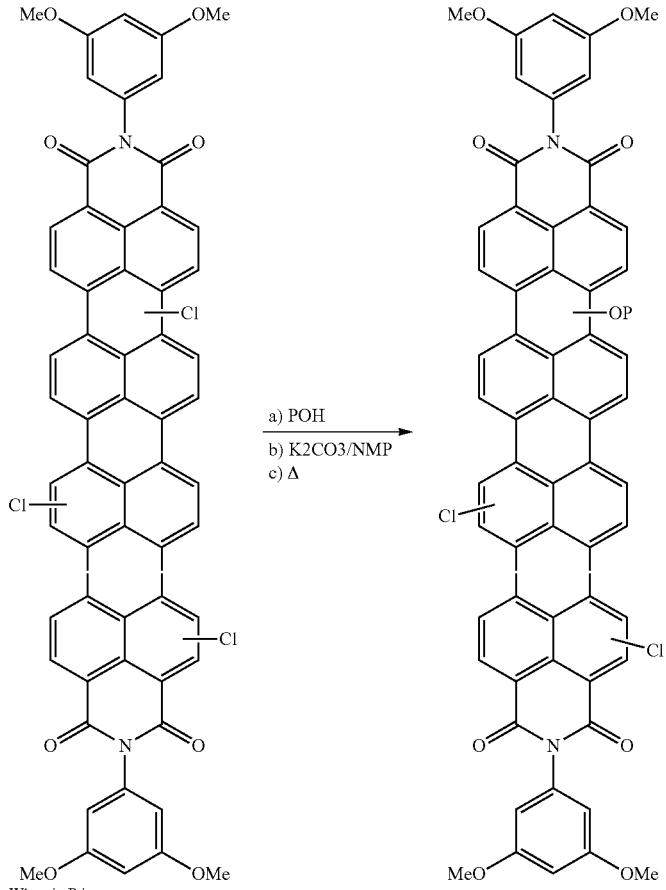

Wherein P is

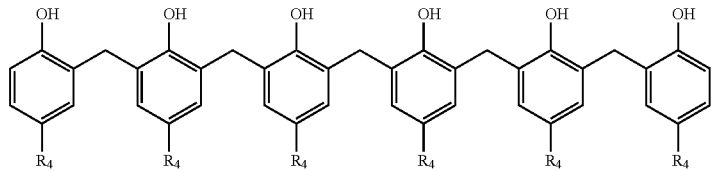

R4 as defined in the claims and the specification

In this regard, it is to be appreciated that in the present specification and the appended claims the letter "P" is used to denote two different entities: in one case an unreacted polymer and in the other case the polymer in which one or more groups thereof have reacted with one or more corresponding groups of one or more quaterrylene and/or terrylene dye molecules to form a (preferably covalent) linkage between the remainder of the polymer and the remainder of the quaterrylene and/or terrylene dye.

A printing ink composition in accordance with the present invention comprises a (preferably polar) liquid medium and one or more (types of) polymer-bonded quaterrylene and/or terrylene dyes as set forth above (e.g., a mixture of two or three different quaterrylene and/or terrylene dyes, all bonded to the same type of polymer, or bonded to more than one type of polymer) dissolved or dispersed in the medium. The concentration of the polymer-bonded quaterrylene and/or terrylene dye(s) in the medium depends on several factors such as, e.g., the polymer(s) to which the quaterrylene and/or terrylene dye(s) is/are bonded, the desired color intensity, the liquid medium, the remaining (optional) components of the composition, the intended purpose of the printing ink composition, and the substrate onto which the printing ink composition is to be applied. Often the (total) concentration of the one or more polymer-bonded quaterrylene and/or terrylene dyes in the printing ink composition will be at least about 0.01%, at least about 0.02%, or at least 0.05% by weight, and will usually be not higher than about 40% by weight, e.g. not higher than about 20%, not higher than about 10%, or not higher than about 5% by weight based on the total weight of the composition.

The intended purpose of the printing ink composition is one of several factors which determines suitable and desirable concentration ranges for the polymer-bonded quaterrylene and/or terrylene dye(s) as well as the types and concentration ranges of suitable or desirable optional components of the composition. There are many different types of printing processes. Non-limiting examples thereof include inkjet printing (thermal, piezoelectric, continuous, etc.), flexography, intaglio printing (e.g., gravure printing), screen printing, letterpress printing, offset printing, pad printing, relief printing, planographic printing and rotogravure printing. In a preferred embodiment, a printing ink composition in accordance with the present invention is suitable (at least) for inkjet printing. Industrial inkjet printers, commonly used for numbering, coding and marking applications on conditioning lines and printing presses, are particularly suitable. Preferred ink jet printers include single nozzle continuous ink jet printers (also called raster or multi level deflected printers and drop-on-demand ink-jet printers, in particular valve jet printers.) Accordingly, the following discussion of printing ink compositions relates primarily to compositions for inkjet printing. However, it is to be kept in mind that the present invention is not limited to printing ink compositions for inkjet printing but rather encompasses all printing ink compositions in which quaterrylene and/or terrylene dyes can be employed. Accordingly, the following considerations and statements apply mutatis mutandis to all printing ink compositions in which the polymer-bonded quaterrylene and/or terrylene dyes in accordance with the teaching of the present invention are useful.

Printing inks in general comprise coloring agents and liquid vehicles which comprise solutions of resinous binders in solvents. The specific choice of binders and solvents depends on several factors, such as, for example, the polymer-bonded quaterrylene and/or terrylene dye(s), the remaining components that are to be present, and the nature of the substrate to be printed. Non-limiting examples of suitable binders for use in the ink compositions for inkjet printing include binders which are conventionally used in inkjet printing inks, including resins such as nitrocellulose, acrylate resins and polyester resins (such as, e.g, DYNAPOL® L 1203, L 205, L 206, L 208, L 210, L 411, L 651, L658, L 850, L 912, L 952, LH 530, LH 538, LH 727, LH 744, LH 773, LH 775, LH 818, LH 820, LH 822, LH 912, LH 952, LH 530, LH 538, LH 727, LH 744, LH 773, LH 775, LH 818, LH 820, LH 822, LH 823, LH 826, LH 828, LH 830, LH 831, LH 832, LH 833, LH 838, LH898, LH 908, LS436, LS615, P1500, S1218, S1227, S1247, S1249, S1252, S1272, S1401, S1402, S1426, S1450, S1510, S1606, S1611, S243, S320, S341, S361, S394, and S EP1408 from Evonik). Of course, other suitable resins known to those of skill in the art may be used as well. A typical (total) concentration of the one or more binders in the printing ink composition is from about 0.5% to about 10% by weight, based on the total weight of the composition. In this regard, it further is to be taken into account that typical viscosity values for inkjet printing inks are in the range of from about 4 to about 30 mPa·s at 25° C.

It further is to be appreciated that the polymer which has one or more quaterrylene and/or terrylene dye molecules bonded thereto (and in the case of the quaterrylene and/or terrylene dye-doped polymer of the present invention as set forth above, also the polymer which is not bonded to any quaterrylene and/or terrylene dye molecule but is present in admixture with polymer that has quaterrylene and/or terrylene dye bonded thereto) may also act as a binder for the composition. At any rate, the (principal) binder of the ink composition must be compatible with the polymer which a quaterrylene and/or terrylene dye bonded thereto, e.g., must not result in the formation of any insoluble substance, etc. when combined with the latter.

Suitable solvents for inkjet printing inks are known to those of skill in the art. Non-limiting examples thereof include low-viscosity, slightly polar and aprotic organic solvents, such as, e.g., methyl ethyl ketone (MEK), acetone, ethyl acetate, ethyl 3-ethoxypropionate, toluene and mixtures of two or more thereof.

In particular if the printing ink composition of the present invention is to be applied by continuous inkjet printing the composition will usually also comprise at least one conductivity imparting agent (for example, a salt). The conductivity imparting agent will have a non-negligible solubility in the composition. Non-limiting examples of suitable conductivity imparting agents include salts such as, e.g., tetraalkyl ammonium salts (e.g., tetrabutyl ammonium nitrate, tetrabutyl ammonium perchlorate and tetrabutyl ammonium hexafluorophosphate), alkali metal thiocyanates such as potassium thiocyanate, alkali potassium salts such as $KPF_6$ and alkali metal perchlorates such as lithium perchlorate. The conductivity imparting agent will be present in a concentration which is sufficient to provide the conductivity which is required or desirable. Of course, mixtures of two or more different conductivity imparting agents (salts) can be used. Often the one or more conductivity imparting agents will be present in a total concentration of from about 0.1% to 2% by weight, based on the total weight of the composition.

The printing ink composition according to the present invention may furthermore comprise one or more customary additives, such as, for example, fungicides, biocides, surfactants, sequestering agents, pH adjusters, etc. in the amounts customary for these additives. Further, the printing ink composition may comprise one or more additional colorants and/or components which impart a specific optical property (i.e., components which are different from the polymer-bonded quaterrylene and/or terrylene dyes of the present invention). These additional components may be selected from, for example, conventional pigments and dyes, luminescent (e.g., fluorescent) pigments and dyes and cholesteric or nematic liquid crystals. Examples of luminescent pigments include certain classes of inorganic compounds such as the sulphides, oxysulphides, phosphates, vanadates, garnets, spinels, etc. of non-luminescent cations, which are doped with at least one luminescent transition-metal or rare-earth metal cation. In order to strengthen the security of the ink composition the composition may further comprise one or more pigments and/or dyes which absorb in the visible or invisible region of the electromagnetic spectrum and/or may further comprise one or more pigments and/or dyes which are luminescent. Non-limiting examples of suitable pigments and/or dyes which absorb in the visible or invisible region of the electromagnetic spectrum include phthalocyanine derivatives. Non-limiting examples of suitable luminescent pigments and/or dyes include lanthanide derivatives. The presence of pigment(s) and/or dye(s) will enhance and reinforce the security of the marking against counterfeiting.

The substrate or article which is to be provided with a marking and/or security feature in accordance with the present invention is not particularly limited and can be of various types. The substrate or article may, for example, consist (essentially) of or comprise one or more of a metal (for example, in the form of a container such as a can for holding various items such as, e.g., beverages or foodstuffs), optical fibers, a woven, a coating, and equivalents thereof, a plastic material, a ceramic material, glass (for example, in the form of a capsule or container such as a bottle for holding various items such as, e.g., beverages or foodstuffs), cardboard, packaging, paper, and a polymeric material. It is pointed out that these substrate materials are given exclusively for exemplifying purposes, without restricting the scope of the invention.

The substrate may furthermore already carry at least one marking or security element which comprises a substance selected from, e.g., inorganic luminescent compounds, organic luminescent compounds, IR-absorbers, magnetic materials, forensic markers, and combinations thereof. The marking or security element can be present in the form of indicia or a data matrix. on the substrate surface or be incorporated (embedded) in the substrate itself. The marking can be present also in the form of a cloud of dots or a specific pattern visible and/or invisible to the naked eye, randomly or not distributed in the item or article or goods or security documents or what is described in the paragraph [0074] or [0075] it is intended to protect and/or authenticate.

EXAMPLES

The following examples illustrate general procedures for making polymer-bonded quaterrylene and for terrylene dyes according to the present invention.

Example 1

Under an inert gas atmosphere 1.4 g of $K_2CO_3$ was added to a solution of 10 g of phenol formaldehyde resin and 0.68 g of PEG 500 in 62.5 ml of NMP. The resultant mixture was heated for about 1 hour at 120° C. Then 0.20 g of trichloro-quaterrylene or tetrabromo-quaterrylene of the above formula (A) was added to the mixture, whereafter heating at 120° C. was continued for about 2 to about 5 hours. Following the completion of the reaction about half of the volume of the NMP was distilled off. The reaction mixture was allowed to cool to room temperature and thereafter poured into 33 g of iced water to which 2 ml of conc. HCl had been added. The resultant precipitate was filtered off and washed 3 times with water and then dried. This afforded about 10 g of crude powder comprising polymer-bonded quaterrylene dye.

The crude powder was used without further purification in the following ink formulations for ink-jet printing.

Example 2

Under an inert gas atmosphere 1.4 g of $K_2CO_3$ was added to a solution of 10 g of phenol formaldehyde resin and 0.68 g of PEG 500 in 62.5 ml of NMP. The resultant mixture was heated for about 1 hour at 120° C. Then 0.15 g of tetrabromo-terrylene or trichloro-terrylene of the above formula (B) was added to the mixture, whereafter heating at 120° C. was continued for about 2 to about 5 hours. Following the completion of the reaction about half of the volume of the NMP was distilled off. The reaction mixture was allowed to cool to room temperature and thereafter poured into 33 g of iced water to which 2 ml of conc. HCl had been added. The resultant precipitate was filtered off and washed 3 times with water and then dried. This afforded about 10 g of crude powder comprising polymer-bonded terrylene dye.

The crude powder was used without further purification in the following ink formulations for ink-jet printing.

Here is disclose some ink formulation which can be used in order to obtain the marking according to the present invention.

Ink Formulation 1

| Component | Function | % b.w. |
| --- | --- | --- |
| Nitrocellulose | Binder resin | 1.5 |
| Lithium Perchlorate | Salt for conductivity | 0.5 |
| Polymer-bonded Quaterrylene Dye | Dye | 1.0 |
| Acetone | Solvent | 97.0 |

Ink Formulation 2

| Component | Function | % b.w. |
| --- | --- | --- |
| Dynapol L411 (Polyester resin) | Binder resin | 1.5 |
| Lithium Perchlorate | Salt for conductivity | 0.3 |
| Polymer-bonded Quaterrylene Dye | Dye | 0.8 |
| Methyl ethyl ketone | Solvent | 97.4 |

Ink Formulation 3

| Component | Function | % b.w. |
| --- | --- | --- |
| Dynapol L411 (Polyester resin) | Binder resin | 1.5 |
| Lithium Perchlorate | Salt for conductivity | 0.3 |
| Polymer-bonded Quaterrylene Dye | Dye | 2.2 |
| Black Microlith ® | Pigment | 1.0 |
| Methyl ethyl ketone | Solvent | 95 |

Ink Formulation 4

| Component | Function | % b.w. |
| --- | --- | --- |
| Nitrocellulose | Binder resin | 1.5 |
| Lithium Perchlorate | Salt for conductivity | 0.5 |
| Polymer-bonded Terrylene Dye | Dye | 1.0 |
| Acetone | Solvent | 97.0 |

Ink Formulation 5

| Component | Function | % b.w. |
| --- | --- | --- |
| Dynapol L411 (Polyester resin) | Binder resin | 1.5 |
| Lithium Perchlorate | Salt for conductivity | 0.3 |
| Polymer-bonded Terrylene Dye | Dye | 0.8 |
| Methyl ethyl ketone | Solvent | 97.4 |

Ink Formulation 6

| Component | Function | % b.w. |
| --- | --- | --- |
| Dynapol L411 (Polyester resin) | Binder resin | 1.5 |
| Lithium Perchlorate | Salt for conductivity | 0.3 |
| Polymer-bonded Terrylene Dye | Dye | 2.2 |
| Black Microlith ® | Pigment | 1.0 |
| Methyl ethyl ketone | Solvent | 95 |

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A method of increasing at least one of the solubility and dispersibility of a quaterrylene and/or terrylene dye in a liquid medium, wherein the method comprises directly covalently binding or through a bridging group the quaterrylene or terrylene dye to a polymer which is soluble in the liquid medium.

2. The method of claim 1, wherein the polymer comprises a phenolic resin of formula

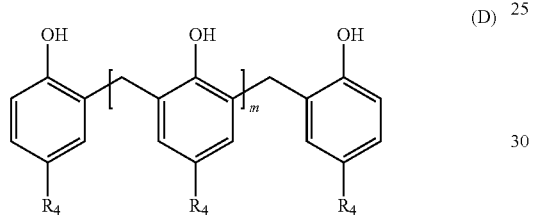

(D)

wherein the groups $R_4$ may be the same or different and are selected from alkyl groups having from 1 to about 10 carbon atoms and the average number of m is from about 1 to about 30.

3. The method of claim 1, wherein the quaterrylene or terrylene dye is a compound of formula (A), (B) or (C):

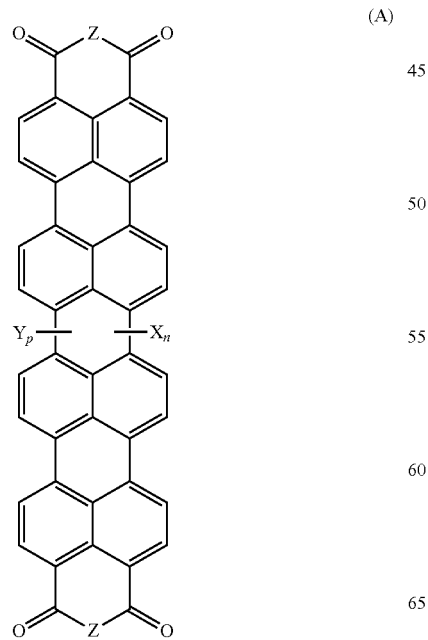

(A)

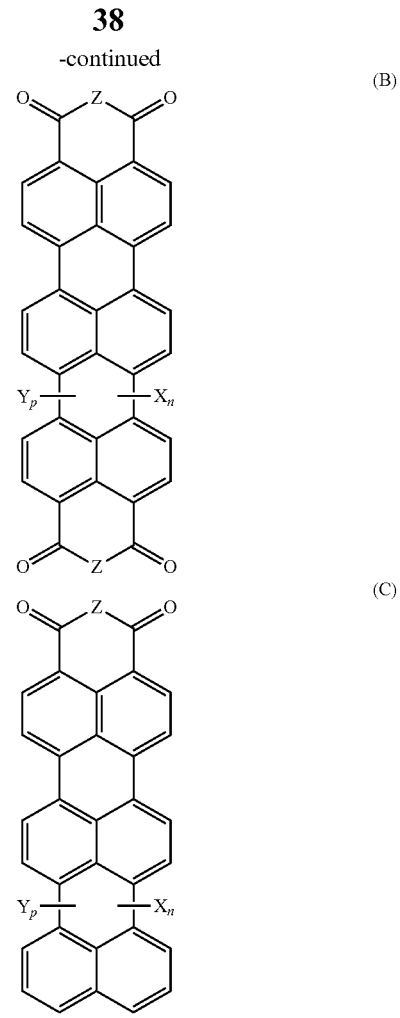

wherein
the groups Z, the same or different from each other, represent O, S or N—R, provided that in the above formulae the unit —CO—Z—CO— (in the case of formula (A) or formula (B) one or both units of formula —CO—Z—CO—) may be replaced by a unit —CS—Z—CO—, or a unit —CS—Z—CS—, or by [—COOH HOOC—] (i.e., the dicarboxylic acid instead of the cyclic anhydride) and further provided that for Z=N—R a unit —CO—Z—CO— may be replaced by a unit of formula —C(=NR')—NR—CO—;
R and R' independently represent an optionally substituted aliphatic, cycloaliphatic, aromatic, heteroaromatic, alkylaryl, alkylheteroaryl, arylalkyl or heteroarylalkyl group having from 1 to about 20 carbon atoms; and R and R' may be combined to form, together with the N atoms to which they are attached, an optionally substituted and/or fused 5- to 7-membered ring;
the groups X may be the same or different and represent halogen, isocyanate and COOH;
the groups Y may be the same or different and are selected from OH, $NO_2$, CN, groups of formula R", OR", COOR", OCOR", CONHR", CON(R")$_2$, OCONHR", OCON(R")$_2$, COR", $SO_3H$, $SO_3R$", $SO_2NHR$", $SO_2N(R")_2$, NHCOR", NRCOR", NHCOOR", NRCOOR", $NHSO_2R$", $NRSO_2R$", NHR", and N(R")$_2$, wherein the groups R" may be the same or different and represent an optionally substituted aliphatic, cycloaliphatic, aromatic, heteroaromatic, alkylaryl, alkylheteroaryl, arylalkyl or heteroarylalkyl group having from 1 to about 20 carbon atoms and may also be combined to form, together with the N atom to which they are attached, an optionally substituted and/or fused 5- to 7-membered ring;

n and p each represent 0 or an integer of from 1 to 8, provided that (n+p) is not higher than 8 and further provided that for n=0 at least one of R, R' and R" comprises at least one group X as substituent.

4. A quaterrylene or terrylene dye whose solubility or dispersibility in a polar liquid medium has been increased by having been directly covalently bonded or though a bridging group to a polymer.

5. A polymer-bonded quaterrylene or terrylene dye of formula (A), (B) or (C):

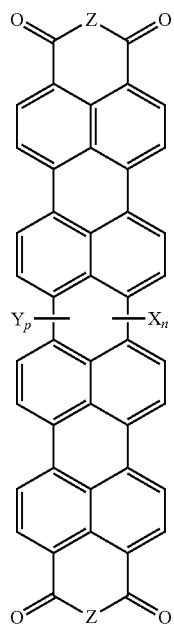

(A)

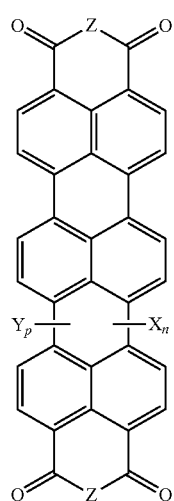

(B)

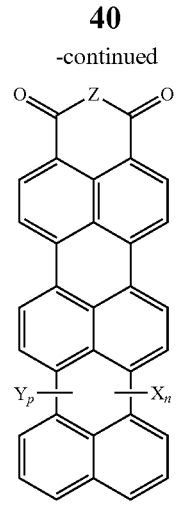

(C)

wherein the groups Z, the same or different from each other, represent O, S or N—R, provided that in the above formulae the unit —CO—Z—CO—(in the case of formula (A) or formula (B) one or both units of formula —CO—Z—CO—) may be replaced by a unit —CS—Z—CO—, or a unit —CS—Z—CS—, or by [—COOH HOOC—] (i.e., the dicarboxylic acid instead of the cyclic anhydride) and further provided that for Z=N—R a unit —CO—Z—CO-may be replaced by a unit of formula —C(=NR')—NR—CO—;

R and R' independently represent an optionally substituted aliphatic, cycloaliphatic, aromatic, heteroaromatic, alkylaryl, alkylheteroaryl, arylalkyl or heteroarylalkyl group having from 1 to about 20 carbon atoms; and R and R' may be combined to form, together with the N atoms to which they are attached, an optionally substituted and/or fused 5- to 7-membered ring;

the groups X may be the same or different and represent halogen, isocyanate and COOH;

the groups Y may be the same or different and are selected from OH, $NO_2$, CN, groups of formula R", OR", COOR", OCOR", CONHR", CON(R")$_2$, OCONHR", OCON(R")$_2$, COR", $SO_3H$, $SO_3R$", $SO_2NHR$", $SO_2N(R")_2$, NHCOR", NRCOR", NHCOOR", NRCOOR", $NHSO_2R$", $NRSO_2R$", NHR", and N(R")$_2$, wherein the groups R" may be the same or different and represent an optionally substituted aliphatic, cycloaliphatic, aromatic, heteroaromatic, alkylaryl, alkylheteroaryl, arylalkyl or heteroarylalkyl group having from 1 to about 20 carbon atoms and may also be combined to form, together with the N atom to which they are attached, an optionally substituted and/or fused 5- to 7-membered ring;

n and p each represent 0 or an integer of from 1 to 8, provided that (n+p) is not higher than 8 and further provided that for n=0 at least one of R, R' and R" comprises at least one group X as substituent;

provided that at least one group X represents a group of formula -L-P wherein L represents a covalent bond or a bridging group and P represents a polymer molecule.

6. The polymer-bonded quaterrylene or terrylene dye of claim 5, wherein the or at least one of the groups Z represents N—R.

7. The polymer-bonded quaterrylene or terrylene dye of claim 6, wherein R is selected from optionally substituted alkyl having from 1 to about 6 carbon atoms, optionally substituted alkylaryl or arylalkyl having from 7 to about 12 carbon atoms, optionally substituted aryl having from about 6 to about 20 carbon atoms, and optionally substituted heteroaryl having from about 3 to about 20 carbon atoms.

8. The polymer-bonded quaterrylene or terrylene dye of claim 6, wherein R is selected from optionally substituted alkyl having from 1 to about 4 carbon atoms, optionally substituted phenyl, or optionally substituted benzyl.

9. The polymer-bonded quaterrylene or terrylene dye of claim 6, wherein R represents phenyl substituted with from 1 to about 3 groups selected from halogen and alkyl having from 1 to about 6 carbon atoms.

10. The polymer-bonded quaterrylene or terrylene dye of claim 9, wherein the phenyl is substituted at least with two alkyl groups which comprise a secondary or tertiary carbon atom.

11. The polymer-bonded quaterrylene or terrylene dye of claim 10, wherein the alkyl groups which comprise a secondary or tertiary carbon atom are selected from isopropyl and tert.-butyl groups.

12. The polymer-bonded quaterrylene or terrylene dye of claim 5, wherein the quaterrylene or terrylene dye is a compound of formula (C).

13. The polymer-bonded quaterrylene or terrylene dye of claim 5, wherein the quaterrylene or terrylene dye is a compound of formula (A) and formula (B) wherein the groups Z may be the same or different and represent O or N—R.

14. The polymer-bonded quaterrylene or terrylene dye of claim 5, wherein L is selected from O, COO, OCO, CONH, and NHCOO.

15. The polymer-bonded quaterrylene or terrylene dye of claim 14, wherein L represents O.

16. The polymer-bonded quaterrylene or terrylene dye of claim 5, wherein P represents a polymer molecule that comprises at least one monomer unit comprising at least one polar group.

17. The polymer-bonded quaterrylene or terrylene dye of claim 16, wherein the at least one polar group is selected from hydroxy, carboxy and amino groups.

18. The polymer-bonded quaterrylene or terrylene dye of claim 5, wherein the polymer comprises a phenolic resin of formula

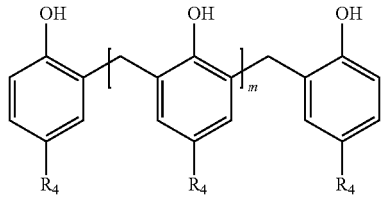

wherein the groups $R_4$ may be the same or different and are selected from alkyl groups having from 1 to about 10 carbon atoms and the average number of m is from about 1 to about 30.

19. The polymer-bonded quaterrylene or terrylene dye of claim 18, wherein $R_4$ is selected from tert-butyl, tert-octyl and branched nonyl.

20. The polymer-bonded quaterrylene or terrylene dye of claim 5, wherein P has more than one perylene dye molecule bonded thereto.

21. The polymer-bonded quaterrylene or terrylene dye of claim 5, wherein P has from 1 to about 6 quaterrylene and/or terrylene dye molecules bonded thereto.

22. A process for making a polymer-bonded quaterrylene or terrylene dye according to claim 5, wherein the process comprises contacting a quaterrylene or terrylene dye of formula (A), (B) or (C):

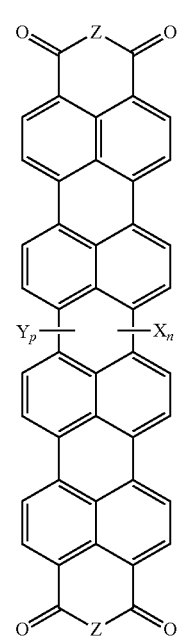

(A)

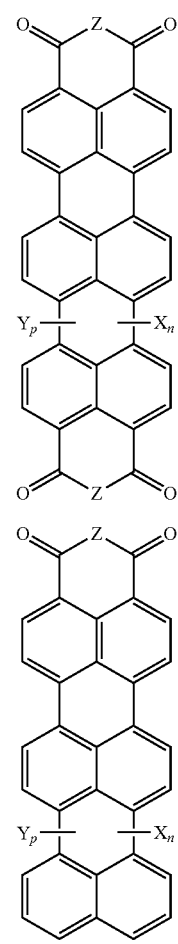

(B)

(C)

wherein the groups Z, the same or different from each other, represent O, S or N—R, provided that in the above formulae the unit —CO—Z—CO— (in the case of formula (A) or formula (B) one or both units of formula —CO—Z—CO—) may be replaced by a unit —CS—Z—CO—, or a unit —CS—Z—CS—, or by [—COOH HOOC—] (i.e., the dicarboxylic acid instead of the cyclic anhydride) and further provided that for Z=N—R a unit —CO—Z—CO-may be replaced by a unit of formula —C(=NR')—NR—CO—;

R and R' independently represent an optionally substituted aliphatic, cycloaliphatic, aromatic, heteroaromatic, alkylaryl, alkylheteroaryl, arylalkyl or heteroarylalkyl group having from 1 to about 20 carbon atoms; and R and R' may be combined to form, together with the N atoms to which they are attached, an optionally substituted and/or fused 5- to 7-membered ring;

the groups X may be the same or different and represent halogen, isocyanate and COOH;

the groups Y may be the same or different and are selected from OH, NO$_2$, CN, groups of formula R", OR", COOR", OCOR", CONHR", CON(R")$_2$, OCONHR", OCON(R")$_2$, COR", SO$_3$H, SO$_3$R", SO$_2$NHR", SO$_2$N(R")$_2$, NHCOR", NRCOR", NHCOOR", NRCOOR", NHSO$_2$R", NRSO$_2$R", NHR", and N(R")$_2$, wherein the groups R" may be the same or different and represent an optionally substituted aliphatic, cycloaliphatic, aromatic, heteroaromatic, alkylaryl, alkylheteroaryl, arylalkyl or heteroarylalkyl group having from 1 to about 20 carbon atoms and may also be combined to form, together with the N atom to which they are attached, an optionally substituted and/or fused 5- to 7-membered ring;

n and p each represent 0 or an integer of from 1 to 8, provided that (n+p) is not higher than 8 and further provided that for n=0 at least one of R, R' and R" comprises at least one group X as substituent;

with a polymer P under conditions which cause a reaction of a group X of the quaterrylene or terrylene dye with a functional group of the polymer to covalently bind the polymer to the quaterrylene or terrylene dye.

23. A polymer-bonded quaterrylene or terrylene dye of one of formulae (I) to (IX):

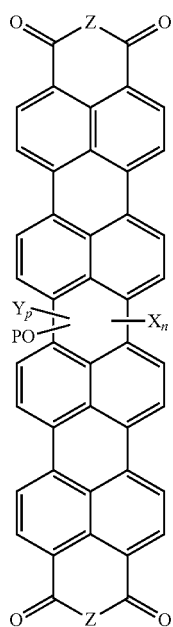

(I)

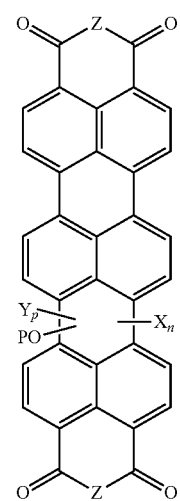

(II)

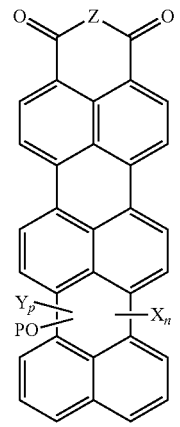

(III)

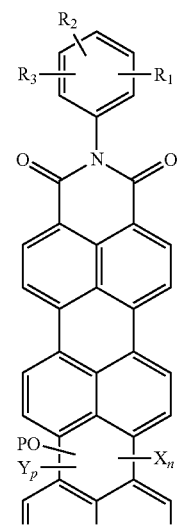

(IV)

-continued
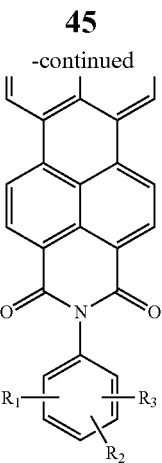
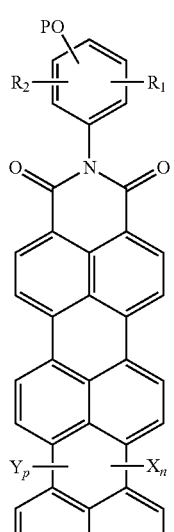
(V)
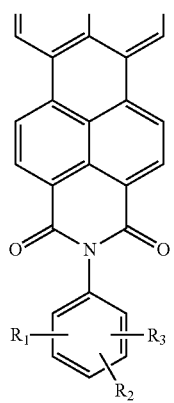
(VI)
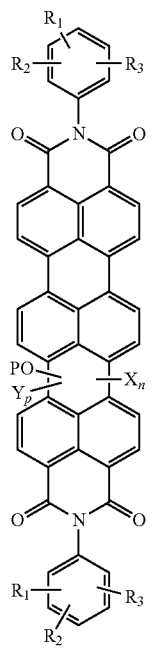
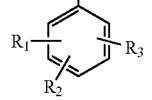
(VII)
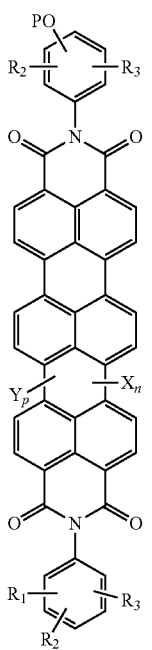

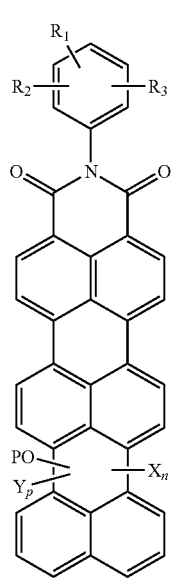

(VIII)

(IX)

wherein the groups Z, the same or different from each other, represent O, S or N—R, provided that in the above formulae the unit —CO—Z—CO— (in the case of formula (I) or (II) one or both units of formula —CO—Z—CO—) may be replaced by a unit —CS—Z—CO—, or a unit —CS—Z—CS—, or by [—COOH HOOC—] (i.e., the dicarboxylic acid instead of the cyclic anhydride) and further provided that for Z=N—R a unit —CO—Z—CO-may be replaced by a unit of formula —C(=NR')—NR—CO—;

R and R' independently represent an optionally substituted aliphatic, cycloaliphatic, aromatic, heteroaromatic, alkylaryl, alkylheteroaryl, arylalkyl or heteroarylalkyl group having from 1 to about 20 carbon atoms; and R and R' may be combined to form, together with the N atoms to which they are attached, an optionally substituted and/or fused 5- to 7-membered ring;

$R_1$, $R_2$ and $R_3$ are independently selected from hydrogen, optionally substituted $C_1$-$C_4$ alkyl, optionally substituted $C_1$-$C_4$ alkyl-COOH, optionally substituted $C_1$-$C_4$ alkyl-$SO_3H$, optionally substituted $C_1$-$C_4$ alkoxy, optionally substituted mono($C_1$-$C_4$)alkylamino, optionally substituted di($C_1$-$C_4$)alkylamino, optionally substituted $C_1$-$C_4$ aminoalkyl, halogen, cyano, nitro, and $SO_3H$;

the groups X may be the same or different and represent halogen, isocyanate and COOH;

the groups Y may be the same or different and are selected from OH, $NO_2$, CN, groups of formula R", OR", COOR", OCOR", CONHR", CO(NR")$_2$, OCONHR", OCO(NR")$_2$, COR", $SO_3H$, $SO_3R$", $SO_2NHR$", $SO_2N(R")_2$, NHCOR", NRCOR", NHCOOR", NRCOOR", $NHSO_2R$", $NRSO_2R$", NHR", and N(R")$_2$, wherein the groups R" may be the same or different and represent an optionally substituted aliphatic, cycloaliphatic, aromatic, heteroaromatic, alkylaryl, alkylheteroaryl, arylalkyl or heteroarylalkyl group having from 1 to about 20 carbon atoms and, where two groups R" are present, may also be combined to form, together with the N atom to which they are attached, an optionally substituted and/or fused 5- to 7-membered ring;

in the case of formulae (V), (VII) and (IX) n and p each represent 0 or an integer of from 1 to 8 (i.e., 1, 2, 3, 4, 5, 6, 7 or 8), provided that (n+p) is not higher than 8; and in the case of the remaining formulae n and p each represent 0 or an integer of from 1 to 7 (i.e., 1, 2, 3, 4, 5, 6 or 7), provided that (n+p) is not higher than 7; and P represents a polymer molecule.

24. The polymer-bonded quaterrylene or terrylene dye of claim 23, wherein P comprises a phenolic resin or phenol formaldehyde resin of formula

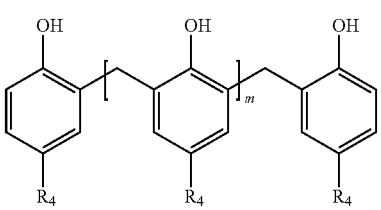

(D)

wherein the groups $R_4$ may be the same or different and are selected from alkyl groups having from 1 to about 10 carbon atoms and the average number of m is from about 4 to about 30.

25. A process for making a polymer-bonded quaterrylene and/or terrylene dye of claim 23, wherein the process comprises contacting at least one compound of one of formulae (I') to (IX'):

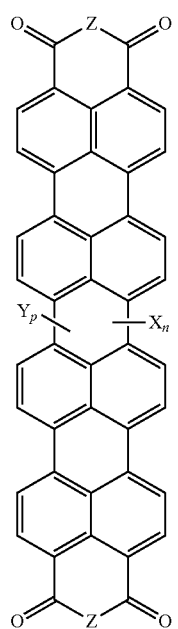 (I')
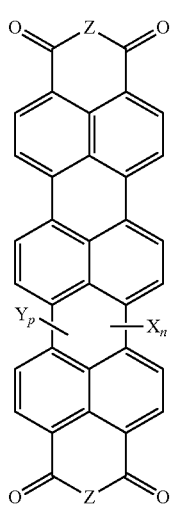 (II')
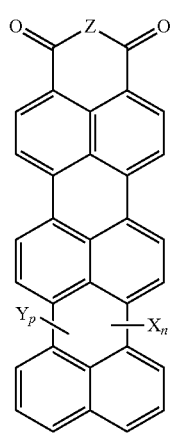 (III')
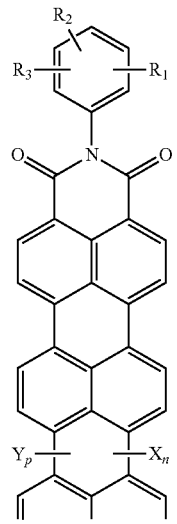 (IV')
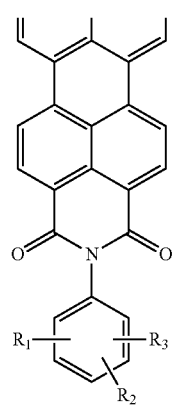
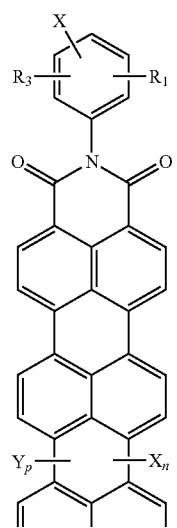 (V')

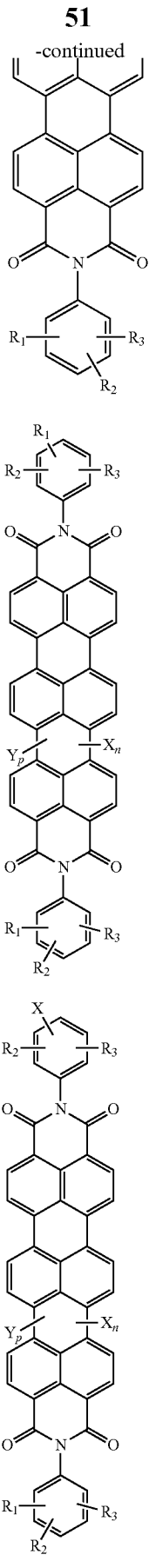

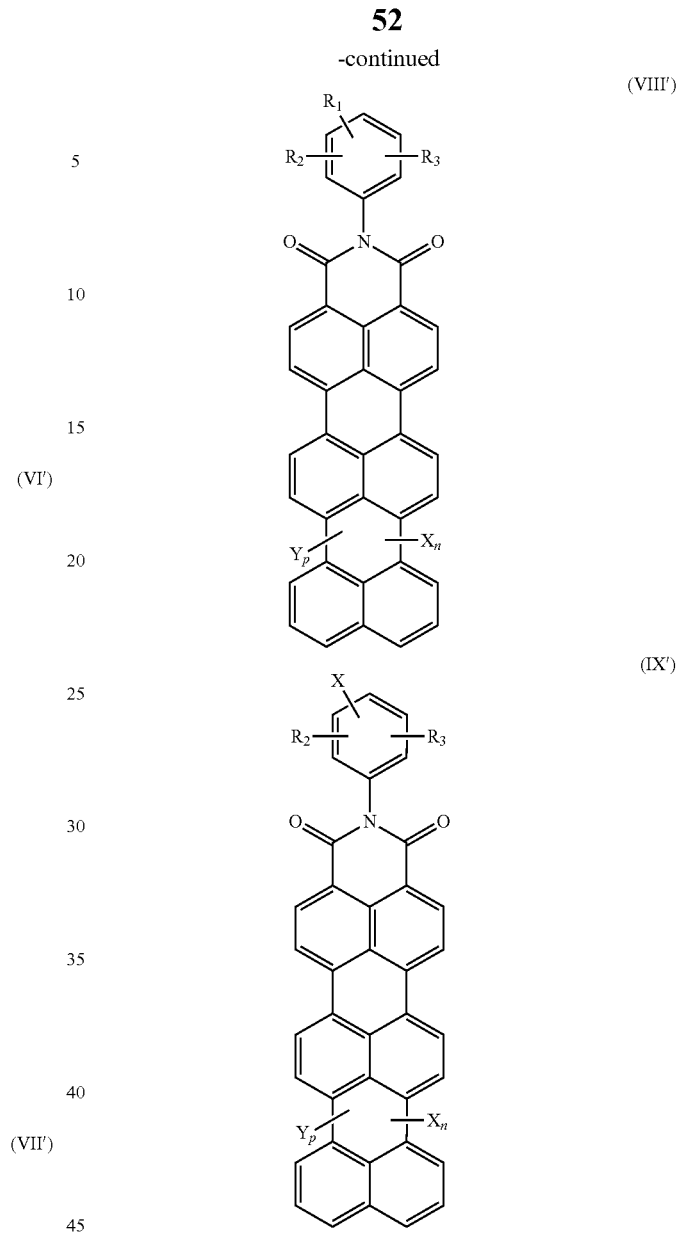

wherein $R_1$, $R_2$, $R_3$, X and Y are as defined in claim 23 and (n+p) is not higher than 8 with a polymer of formula P wherein P is a polymer molecule which comprises a group which is capable of reacting with X to replace X by a group of formula OP.

26. A printing ink composition, wherein the composition comprises a polar liquid medium and at least one polymer-bonded quaterrylene and/or terrylene dye of claim 4 dissolved or dispersed in the medium.

27. A marking or security feature which is made with the printing ink composition of claim 26.

28. A marking or security feature which comprises at least one polymer-bonded perylene dye of claim 4.

29. An article which comprises the marking or security feature of claim 27.

30. The article of claim 29, wherein the article is at least one of a can, a metal, an aluminum foil, a cartridge, a capsule, an article made of glass, an article made of ceramic, a packaging, a banknote, a passport, a security document, a value document, a ticket, a thread, a label, a card, and a commercial good.

31. A method of authenticating an article, wherein the method comprises providing the article with the marking or security feature of claim 27.

32. A method of authenticating an article, wherein the method comprises applying onto the article the printing ink composition of claim 26.

33. A dye-doped polymer, wherein at least about 0.1% of the polymer molecules have bonded thereto at least one quaterrylene and/or at least one terrylene dye and wherein the polymer is produced by the process of claim 22.

34. The polymer of claim 33, wherein the polymer comprises a phenolic resin of formula

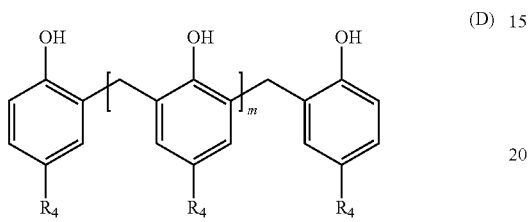

(D)

wherein the groups $R_4$ may be the same or different and are selected from alkyl groups having from 1 to about 10 carbon atoms and the average number of m is from about 1 to about 30.

35. A liquid medium composition comprising a liquid medium and at least one polymer-bonded quaterrylene and/or terrylene dye of claim 4 dissolved or dispersed in the medium.

* * * * *

UNITED STATES PATENT AND TRADEMARK OFFICE
CERTIFICATE OF CORRECTION

PATENT NO. : 8,859,688 B2  
APPLICATION NO. : 13/479872  
DATED : October 14, 2014  
INVENTOR(S) : T. Tiller et al.

Page 1 of 1

It is certified that error appears in the above-identified patent and that said Letters Patent is hereby corrected as shown below:

On the Title Page, at Item (73) Assignee, of the printed patent, "SICPA Holding SA" should read --SICPA HOLDING SA--.

In the Claims

At column 39, line 13 (claim 4, line 3), "though" should read --through--.

Signed and Sealed this  
Thirty-first Day of March, 2015

Michelle K. Lee  
*Director of the United States Patent and Trademark Office*